United States Patent
Bar Hillel et al.

(10) Patent No.: US 11,220,324 B2
(45) Date of Patent: Jan. 11, 2022

(54) APPARATUS FOR A VEHICLE

(71) Applicant: ISRAEL AEROSPACE INDUSTRIES LTD., Lod (IL)

(72) Inventors: Shahar Bar Hillel, Modiin (IL); Saar Shragai, Beer Yaakov (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 239 days.

(21) Appl. No.: 16/478,221

(22) PCT Filed: Feb. 1, 2018

(86) PCT No.: PCT/IL2018/050112
§ 371 (c)(1),
(2) Date: Jul. 16, 2019

(87) PCT Pub. No.: WO2018/142402
PCT Pub. Date: Aug. 9, 2018

(65) Prior Publication Data
US 2020/0031451 A1  Jan. 30, 2020

(30) Foreign Application Priority Data
Feb. 2, 2017  (IL) .......................................... 250433

(51) Int. Cl.
*B64C 5/12* (2006.01)
*F42B 10/06* (2006.01)
(Continued)

(52) U.S. Cl.
CPC ................ *B64C 5/12* (2013.01); *F42B 10/06* (2013.01); *F42B 10/12* (2013.01); *F42B 10/20* (2013.01); *F42B 10/28* (2013.01); *F42B 10/50* (2013.01)

(58) Field of Classification Search
CPC .. B64C 5/12; F42B 10/06; F42B 10/12; F42B 10/20; F42B 10/28; F42B 10/50
See application file for complete search history.

(56) References Cited

U.S. PATENT DOCUMENTS 3,125,313 A * 3/1964 Soderberg ................ B64G 1/62
 244/87
4,005,655 A * 2/1977 Kleinschmidt ......... F42B 10/50
 102/386

(Continued)

FOREIGN PATENT DOCUMENTS

| CN | 205808260 U | 12/2016 |
|---|---|---|
| DE | 3614563 A1 | 11/1987 |
| WO | 2009113048 A1 | 9/2009 |

OTHER PUBLICATIONS

International Search Report and Written Opinion from International Application No. PCT/IL2018/050112 dated May 10, 2018.

(Continued)

*Primary Examiner* — Justin M Benedik
(74) *Attorney, Agent, or Firm* — Marcus S. Simon

(57) ABSTRACT

Apparatuses for a projectile are provided, the projectile configured for weapons band launching, examples of the apparatus comprising a body, an inflation system and external walls. The body is inflatable by the inflation system, from a deflated configuration having a first volume to an inflated configuration having a second volume, greater than the first volume. The external walls are deployable from an undeployed configuration to a deployed configuration responsive to the body being inflated. In the undeployed configuration and at an operating airspeed, the center of pressure is located at a first position with respect to the projectile. In the deployed configuration the external walls provide a deployed external surface geometry exposed to an airflow corresponding to the operating airspeed, such that (Continued)

the center of pressure is located at a second position with respect to the projectile, different from the first position.

18 Claims, 12 Drawing Sheets

(51) Int. Cl.
*F42B 10/50* (2006.01)
*F42B 10/20* (2006.01)
*F42B 10/28* (2006.01)
*F42B 10/12* (2006.01)

(56) References Cited

U.S. PATENT DOCUMENTS

| | | | | |
|---|---|---|---|---|
| 4,659,037 A * | 4/1987 | Unterstein | ............ | F42B 10/20 244/3.28 |
| 4,832,288 A * | 5/1989 | Kendall | ............ | B64G 1/62 244/113 |
| 5,211,358 A | 5/1993 | Bagley | | |
| 5,871,173 A * | 2/1999 | Frank | ............ | F41J 9/10 244/1 TD |
| 6,502,785 B1 * | 1/2003 | Teter | ............ | F42B 10/64 244/3.22 |
| 6,723,972 B2 | 4/2004 | Schroeder et al. | | |
| 6,869,043 B1 | 3/2005 | Carlyle et al. | | |
| 6,871,818 B1 | 3/2005 | King et al. | | |
| 2011/0024550 A1 * | 2/2011 | McDermott | ............ | F42B 10/44 244/3.27 |
| 2014/0042267 A1 * | 2/2014 | Featherstone | ............ | B64G 1/62 244/3.24 |

OTHER PUBLICATIONS

Brown, et al., "Inflatable Structures for Deployable Wings", American Institute of Aeronautics & Astronautics or Published with Permission of Author(s) and/or Author(s)' Sponsoring Organization, 2001, pp. 19-26.

Jacob, et al., "Design and Flight Testing of Inflatable Wings with Wing Warping", University of Kentucky; Society of Automotive Engineers Inc.,, 2005, pp. 1-10.

Sudduth, "Design of a Hybrid Rocket/Inflatable Wing UAV", Oklahoma State University, 2012, pp. 1-186.

* cited by examiner

SECTION A-A

SECTION B-B

APPARATUS FOR A VEHICLE

TECHNOLOGICAL FIELD

The presently disclosed subject matter relates to apparatus for a vehicle, in particular for air vehicles, and more particularly to stabilizers, and to vehicles comprising stabilizers. In particular, the presently disclosed subject matter relates to deployable stabilizers, to mechanisms and methods for deploying stabilizers and to vehicles comprising deployable stabilizers, and to methods and mechanism for controlling a vehicle moving in a fluid medium.

BACKGROUND ART

References considered to be relevant as background to the presently disclosed subject matter are listed below:
    U.S. Pat. No. 6,871,818
    U.S. Pat. No. 6,869,043
    U.S. Pat. No. 6,723,972
    WO 2009/113048
    "Design of a Hybrid Rocket/Inflatable Wing UAV", Cory Suduth, Oklahoma State University, 2012.
    "Design and Flight Testing of Inflatable Wings with Wing Warping", J D Jacob et al, University of Kentucky; Society of Automotive Engineers Inc., 2005.
    "Inflatable Structure for Deployable Wings, G Brow et al, American Institute of Aeronautics & Astronautics, 2001.
Acknowledgement of the above references herein is not to be inferred as meaning that these are in any way relevant to the patentability of the presently disclosed subject matter.

BACKGROUND

It is known to stabilize an air vehicle in flight, thereby preventing tumbling, by ensuring that the center of lift (also referred to as the center of pressure) is aft of the center of gravity of the air vehicle. The larger the static margin, which is the distance between the center of lift and the center of gravity as a proportion of the air vehicle length, the more stable the air vehicle is in flight. While an air vehicle may be stable at launch, events, such as for example jettisoning of part of the air vehicle or of the body to which the air vehicle was previously attached during an earlier flight phase, can cause the center of lift to move and the static margin to be altered, such that it may no longer be sufficient to ensure stable flight.

There are other events that can cause the static margin to be altered. Such events can include, for example, movement of the center of gravity (for example as a result of consumption of fuel and/or of deployment of weapons or stores from the air vehicle), movement of the center of pressure as the speed and/or angle of attack of the air vehicle changes, and so on.

There are many examples of air vehicles, in particular projectiles, which use a flared body at an aft end of the vehicle as a stabilizer or destabilizer to effectively move the center of lift of the air vehicle in an aft or forward direction. Other examples for stabilizers/destabilizers include fins.

For example, U.S. Pat. Nos. 6,871,818 and 6,869,043 each discloses a flare disposed toward the rear of the projectile, the flare having petals that deploy from a first, stowed position to a second, deployed position upon the occurrence of the event. In the stowed position, the petals are aligned with the air stream, in order to minimize drag. In the deployed position, the petals project into the air stream in such a way as to move the lift center rearward. A slide ring within the flare has sufficient inertia that it shifts aft in response to an acceleration that occurs when the attached body and the projectile are separated from one another. The slide ring is linked to the petals in such a way that the petals are deployed by the displacement of the slide ring. The slide ring is prevented from moving aft during launch of the projectile by slide supports which separate from the aft body when the separation event occurs. Detents lock the slide ring in its displaced position.

In U.S. Pat. No. 6,723,972, a method and apparatus are disclosed for planar actuation of a flared surface to control a vehicle. According to one aspect, there is disclosed an apparatus for controlling a vehicle capable of moving through a fluid medium. The apparatus includes a flare; a planar yoke operably associated with the flare; a plurality of actuators capable of moving the planar yoke to manipulate the flare through the operable association between the planar yoke and the flare; and a load bearing structure through which the translating means imparts a moment from the flare to the vehicle. According to another aspect, there is disclosed a method for controlling the maneuvering of a vehicle capable of moving through a fluid medium. The method includes moving a planar yoke to deflect at least a portion of a flare.

In WO 2009/113048, an apparatus and method are provided for controlling a vehicle in motion through a fluid medium. A manipulable flare assembly is mounted to a load bearing structure, the structure being configured for mounting to the vehicle. An actuating mechanism has a rotational member operably associated with the flare assembly, the actuating mechanism being configured for selectively providing relative rotation between the rotational member and the load bearing structure. The actuating mechanism is configured for manipulating the flare assembly responsive to selective relative rotation between the rotational member and the load bearing structure. A vehicle is also provided incorporating the apparatus.

GENERAL DESCRIPTION

According to a first aspect of the presently disclosed subject matter there is provided an apparatus for a projectile, the projectile configured to be launched from a weapons barrel, wherein in operation of the apparatus in association with the projectile under predetermined operating conditions the projectile has a center of pressure, said predetermined operating conditions including an operating airspeed for the projectile greater than a threshold airspeed, the apparatus defining a reference axis and comprising:
    a body inflatable from a deflated configuration having a first volume to an inflated configuration having a second volume, said second volume being greater than said first volume;
    an inflation system for selectively inflating said body from said deflated configuration to said inflated configuration;
    external walls deployable from an undeployed configuration to a deployed configuration responsive to said body being inflated from said deflated configuration to said inflated configuration;
    wherein in said undeployed configuration and at said operating airspeed, said center of pressure is located at a first position with respect to the projectile along said reference axis; and
    wherein in said deployed configuration said external walls provide a deployed external surface geometry exposed to an airflow corresponding to said operating airspeed, such that said center of pressure is located at a second position with respect to the projectile along said reference axis, said second position being different from said first position.

For example, in said deployed configuration said deployed external surface geometry is outwardly projecting with respect to said reference axis as compared with a nominal external surface geometry of said external walls provided in said undeployed configuration.

Additionally or alternatively, for example, in said deployed configuration said external walls provide a deployed external surface geometry that is exposed to an airflow in operation of the apparatus and that has a first forward facing area, and wherein in said undeployed configuration said external walls provide an undeployed external surface geometry that is exposed to said airflow in operation of the apparatus and that has a second forward facing area, said first forward facing area being greater than said second forward facing area.

Additionally or alternatively, for example, said threshold airspeed is 0.6 Mach Number or 0.7 Mach Number, or in the range of 0.5 Mach Number to 0.7 Mach Number.

Additionally or alternatively, for example, said operating airspeed is greater than 0.6 Mach Number, or greater than 0.7 Mach number, or in the range 0.6 Mach Number to 1.5 Mach Number, or in the range 0.6 Mach Number to 2.0 Mach Number, or in the range 0.6 Mach Number to 2.5 Mach Number, or in the range 0.6 Mach Number to 3.0 Mach Number, or in the range 0.7 Mach Number to 1.5 Mach Number, or in the range 0.7 Mach Number to 2.0 Mach Number, or in the range 0.7 Mach Number to 2.5 Mach Number, or in the range 0.7 Mach Number to 3.0 Mach Number.

Additionally or alternatively, for example, said reference axis is a longitudinal axis of the projectile or is coaxial with a longitudinal axis of the projectile.

Additionally or alternatively, for example, wherein said first position is spaced from said second position along said reference axis.

Additionally or alternatively, for example, said second position is aft with respect to said first position along said reference axis.

Additionally or alternatively, for example, said second position is forward with respect to said first position along said reference axis.

Additionally or alternatively, for example, said external walls are configured for deploying from said undeployed configuration to said deployed configuration in directions along more than one axis orthogonal to said reference axis.

Additionally or alternatively, for example, said external walls are configured for deploying from said undeployed configuration to said deployed configuration in a plurality of radial directions away from said reference axis.

Additionally or alternatively, for example, said body circumferentially encloses said reference axis in planes orthogonal to said reference axis.

Additionally or alternatively, for example, said body is generally axisymmetric with respect to said reference axis.

Additionally or alternatively, for example, said apparatus is in the form of a flare module.

Additionally or alternatively, for example, said deployed external geometry defines a generally frusto-conical form or a generally cylindrical form. For example, said frusto-conical form has an external diameter that increases in an aft direction with respect to the projectile.

Additionally or alternatively, for example, said nominal external surface geometry defines a non generally frusto-conical form.

Additionally or alternatively, for example, in said deflated configuration said external walls are accommodated within a cylindrical envelope having a diameter within ±10% of a baseline diameter, wherein the baseline diameter is a diameter of the projectile immediately forward of the apparatus when the apparatus is mounted to the projectile.

Additionally or alternatively, for example, in said deflated configuration said external walls have a generally undulating form, including a plurality of lobes.

Additionally or alternatively, for example, in said deflated configuration said external walls are partially folded at a plurality of fold lines, said fold line being at least partially aligned longitudinally.

Additionally or alternatively, for example, in said deflated configuration said external walls generally at least partially mutual overlapped in a circumferential direction with respect to said reference axis.

Additionally or alternatively, for example, said body has a general toroidal form.

Additionally or alternatively, for example, said external walls comprise a plurality of petals, different from said body, and wherein said plurality of petals forms a flare assembly.

For example, said plurality of petals includes a first set of primary petals intercalated circumferentially with a second set of secondary petals, said primary petals and said secondary petals being individually pivoted to a load bearing structure. For example, said first set of primary petals is coupled with said second set of secondary petals.

Additionally or alternatively, for example, in operation of the body to inflate from said deflated configuration to said inflated configuration, a part of the body urges said petals to pivot in an outward direction with respect to the reference axis to thereby provide said deployed configuration.

Additionally or alternatively, for example, said petals are one of unaffixed mechanically with respect to said body, and, affixed mechanically with respect to said body.

Additionally or alternatively, for example, said apparatus is in the form of a fin module. For example, said body comprises a central plug portion and a plurality of fin elements. For example, said central plug portion has a circumferential periphery, and wherein said fin elements is circumferentially disposed along said circumferential periphery. Additionally or alternatively, for example, said plug portion defines an internal plug chamber, and wherein each said fin element defines an internal fin chamber in fluid communication with said internal plug chamber. Additionally or alternatively, for example, each said fin element has aerofoil sections in planes parallel to and radially spaced from said reference axis. For example, each said aerofoil section has zero camber. For example, each fin element comprises symmetrical aerofoils. Additionally or alternatively, for example, each said fin element is configured for deploying from said undeployed configuration to said deployed configuration in a generally radial directions away from said reference axis. For example, in said undeployed configuration each said fin is in a radially collapsed configuration. Additionally or alternatively, for example, in said deflated configuration said fin elements are at least partially folded at a plurality of fin fold lines, said fin fold line being at least partially aligned longitudinally. Additionally or alternatively, for example, in said undeployed configuration said fins adopt a wrap-around configuration with respect to said plug portion. Additionally or alternatively, for example, in said deployed configuration said fins have a linear configuration, wherein a span of each said fin is rectilinear. Additionally or alternatively, for example, in said deployed configuration said fins have a non-linear configuration, wherein a span of each said fin is curved.

Additionally or alternatively, for example, said body comprises any one of a balloon-type body and a bellows-type body.

Additionally or alternatively, for example, said body is configured for providing said deployed external surface geometry to said external walls. For example, said body comprises a first longitudinal end, a second longitudinal end longitudinally spaced from said first longitudinal end, an outer wall and an inner wall, wherein said first longitudinal end, said second longitudinal end, said inner wall and said outer wall define a body internal space, wherein said body internal space provides said first volume at said deflated configuration and said second volume at said inflated configuration. Alternatively, for example, said body comprises a first longitudinal end, a second longitudinal end longitudinally spaced from said first longitudinal end, and an outer wall, wherein said first longitudinal end, said second longitudinal end, and said external wall define a body internal space, wherein said body internal space provides said first volume at said deflated configuration and said second volume at said inflated configuration. Additionally or alternatively, for example, at least in the inflated configuration, the first longitudinal end has a larger outer width dimension than the second longitudinal end.

Additionally or alternatively, for example, said outer walls are any one of integrally formed with said external walls, and, mechanically affixed to with said external walls.

Additionally or alternatively, for example, said outer walls constitute at least a portion or all of said external walls.

For example, said external walls comprise a plurality of rigid or semi rigid panels, wherein each pair of adjacent said panels are laterally joined to one another via a flexible interconnecting portion, wherein in said deflated configuration the interconnecting portions are in compact configuration, and wherein in the inflated configuration, the interconnecting portions are in expanded configuration.

Additionally or alternatively, for example, at least a portion of said external walls is elastic, deforming between a first shape corresponding to said deflated configuration and a second shape corresponding to said inflated configuration.

Additionally or alternatively, for example, said inflation system comprises a pressurized gas vessel having an outlet and a valve, the valve being operable to open under said predetermined conditions to allow fluid communication between said pressurized vessel and said body. For example, said inflatable system comprises a pyrotechnic actuator configured for causing said valve to open under said predetermined conditions.

Additionally or alternatively, for example, in operation of the body associated with the projectile and in motion within a fluid, at least a portion of said external walls is exposed to a flow of the fluid at said deflated configuration and at said inflated configuration.

Additionally or alternatively, for example, said apparatus is in the form of an aft module configured for being mounted with respect to an aft end of the projectile.

Additionally or alternatively, for example, said apparatus is in the form of an aft module configured for providing longitudinal stability to the projectile.

According to the first aspect of the presently disclosed subject matter there is also provided a projectile comprising an apparatus as defined herein. For example, the projectile is a shell, or a bullet, or a missile.

According to another aspect of the presently disclosed subject matter there is provided an aft module for use with a projectile, comprising a body configured for being mounted with respect to the projectile, the body having a reference axis, an external surface and an internal volume, said body being inflatable from a deflated configuration to an inflated configuration, wherein in said inflated configuration said external surface has a generally frusto-conical configuration.

According to another aspect of the presently disclosed subject matter there is provided an aft module for use with a projectile, comprising a body configured for being mounted with respect to the projectile, the body having a reference axis, a plug portion and a plurality of inflatable fin elements, said body being inflatable from a deflated configuration to an inflated configuration, wherein in said inflated configuration said fin elements project radially away from said reference axis by a first radius, and wherein in said deflated configuration said fin elements project radially away from said reference axis by a second radius, said first radius being greater than said second radius.

For example, said fin elements are arranged circumferentially arranged about the reference axis in a uniform manner.

Additionally or alternatively, for example, the plurality of fin elements can include two said fin elements, or three said fin elements, or four said fin elements, or five said fin elements, or six said fin elements, or seven said fin elements, or eight said fin elements, or nine said fin elements, or ten said fin elements or eleven said fin elements, or twelve said fin elements, or more than twelve said fin elements.

Additionally or alternatively, for example, the plurality of fin elements can include more than two said fin elements, or more than three said fin elements, or more than four said fin elements, or more than five said fin elements, or more than six said fin elements, or more than seven said fin elements, or more than eight said fin elements, or more than nine said fin elements, or more than ten said fin elements or more than eleven said fin elements, or more than twelve said fin elements.

For example, said central plug portion has a circumferential periphery, and wherein said fin elements is circumferentially disposed along said circumferential periphery. Additionally or alternatively, for example, said plug portion defines an internal plug chamber, and wherein each said fin element defines an internal fin chamber in fluid communication with said internal plug chamber. Additionally or alternatively, for example, each said fin element has aerofoil sections in planes parallel to and radially spaced from said reference axis. For example, each said aerofoil section has zero camber. For example, each fin element comprises symmetrical aerofoils. Additionally or alternatively, for example, each said fin element is configured for deploying from said undeployed configuration to said deployed configuration in a generally radial directions away from said reference axis. For example, in said undeployed configuration each said fin is in a radially collapsed configuration. Additionally or alternatively, for example, in said deflated configuration said fin elements are at least partially folded at a plurality of fin fold lines, said fin fold line being at least partially aligned longitudinally. Additionally or alternatively, for example, in said undeployed configuration said fins adopt a wrap-around configuration with respect to said plug portion. Additionally or alternatively, for example, in said deployed configuration said fins have a linear configuration, wherein a span of each said fin is rectilinear. Additionally or alternatively, for example, in said deployed configuration said fins have a non-linear configuration, wherein a span of each said fin is curved.

The aft module can further comprise, for example, an inflation system for selectively inflating said body from said deflated configuration to said inflated configuration. For example, the inflation system can be similar to that disclosed above in the context of other aspects of the presently disclosed subject matter.

According to another aspect of the presently disclosed subject matter there is provided a method for operating a projectile, comprising:

(a) providing the projectile, the projectile comprising an apparatus as defined in according to the first aspect of the presently disclosed subject matter;

(b) at said predetermined conditions, selectively activating said inflation system to thereby inflate said body from said deflated configuration to said inflated configuration, and concurrently deploying said external walls from said undeployed configuration to said deployed configuration.

According to another aspect of the presently disclosed subject matter there are provided apparatuses for a projectile are provided, the projectile being configured to be launched from a weapons barrel, examples of the apparatus comprising a body, an inflation system and external walls. The body is inflatable, from a deflated configuration having a first volume to an inflated configuration having a second volume, greater than the first volume. The external walls are deployable from an undeployed configuration to a deployed configuration responsive to the body being inflated, by the inflation system, from the deflated configuration to the inflated configuration. In the undeployed configuration and at an operating airspeed, the center of pressure is located at a first position with respect to the projectile along said reference axis. In the deployed configuration the external walls provide a deployed external surface geometry exposed to an airflow corresponding to the operating airspeed, such that the center of pressure is located at a second position with respect to the projectile, different from the first position.

A feature of at least one example of the presently disclosed subject matter is that such an apparatus can be deployed in a fast and reliable manner.

Another feature of at least one example of the presently disclosed subject matter is that such an apparatus is provided with an actuation system that is mechanically simpler than currently used in conventional systems.

Another feature of at least one example of the presently disclosed subject matter is that such an apparatus is provided with an actuation system that can be lighter than currently used in conventional systems.

Another feature of at least one example of the presently disclosed subject matter is that a conventional flare module design can be modified to be retrofitted with the actuation system according to the presently disclosed subject matter.

Another feature of at least one example of the presently disclosed subject matter is that a flare module can be provided with inflation system that can be selectively operated to provide fast deployment of the flare module to the deployed configuration.

Another feature of at least one example of the presently disclosed subject matter is that a flare module can be provided with inflation system that can be selectively operated to provide reliable deployment of the flare module to the deployed configuration.

Another feature of at least one example of the presently disclosed subject matter is that a flare module can be provided with inflation system that can be easily installed in the flare module to enable deployment of the flare module to the deployed configuration.

Another feature of at least one example of the presently disclosed subject matter is that a flare module can be provided with inflation system and/or body that can be easily replaced in the flare module, for example in case of malfunction of the inflation system body and/or of the body, to enable deployment of the flare module to the deployed configuration.

Another feature of at least one example of the presently disclosed subject matter is that an apparatus can be provided with inflation system that is essentially self-contained and operates in a self-contained manner to expand the body from an unexpanded form to an expanded form, to thereby enable, when installed in the flare module, deployment of the flare module to the deployed configuration.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1:
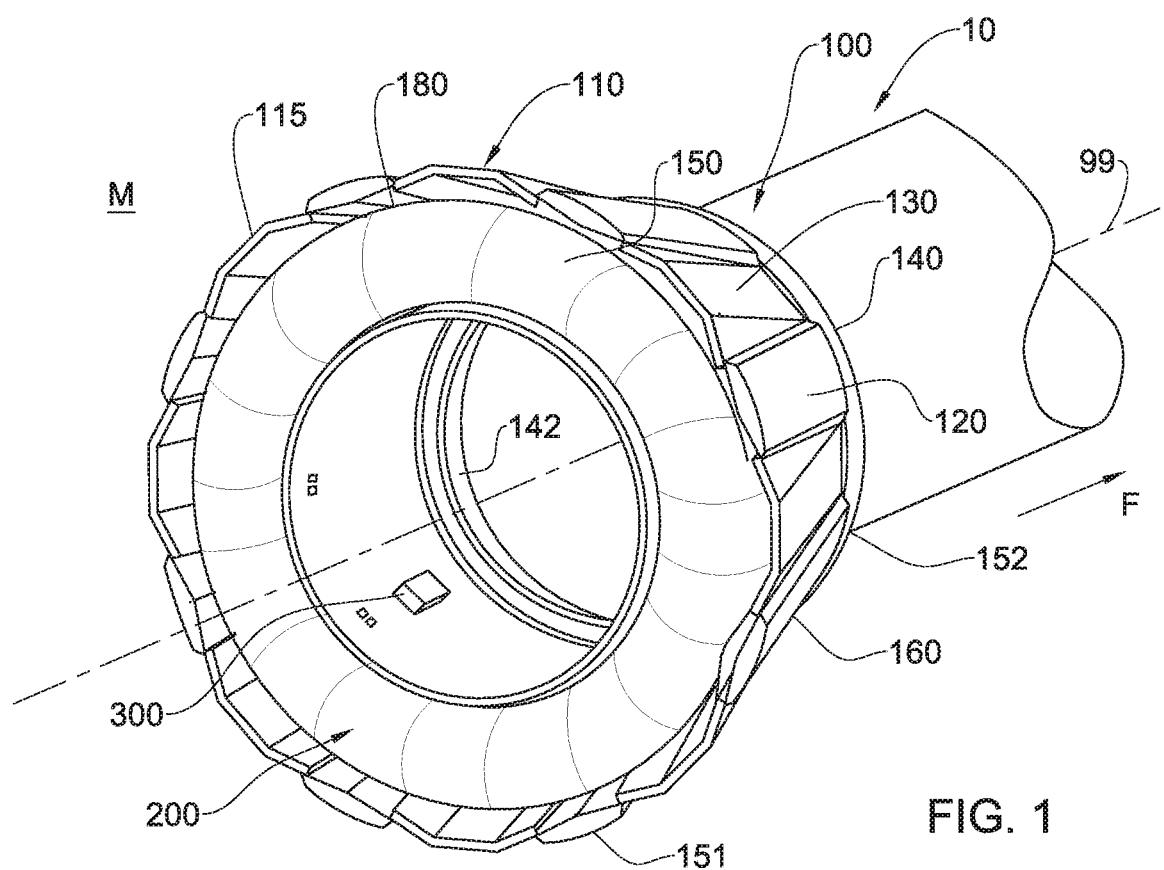
FIG. 1 shows, in rear perspective view, an apparatus according to the first example of the presently disclosed subject matter, in deployed configuration.
Figure 2:
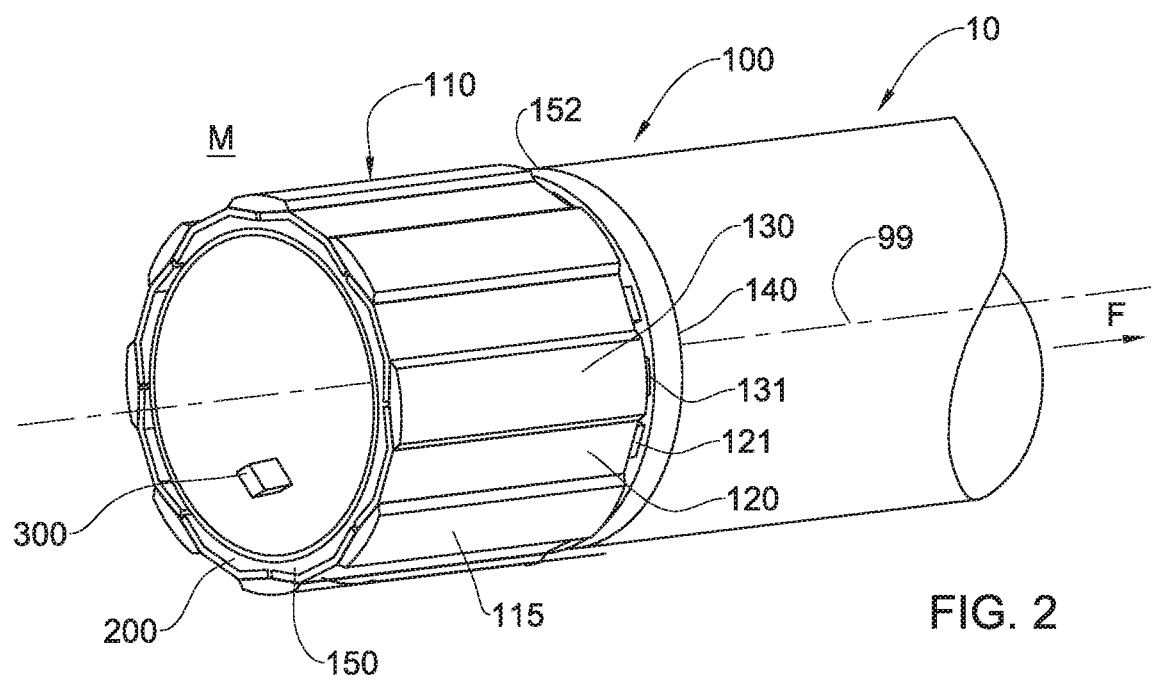
FIG. 2 shows, in rear perspective view, the example of FIG. 1, in undeployed configuration.

Referring to FIGS. 1 and 2, an apparatus for controlling the motion of a vehicle 10 in a fluid medium M, according to a first example of the presently disclosed subject matter, is in the form of stabilizer and/or non-stabilizer module, in particular in the form of a flare module, generally designated herein with reference numeral 100, and comprises external walls 115, an expandable body in the form of an inflatable body 200, and actuation mechanism in the form of an inflation system 300.

Figure 3A:
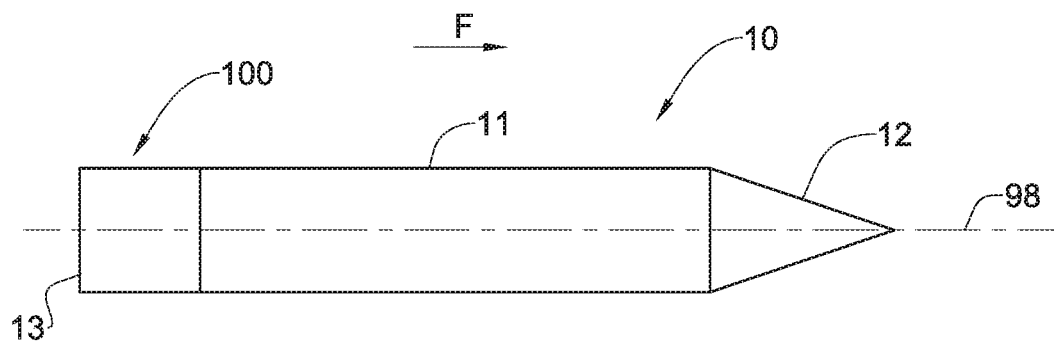
FIGS. 3(a) and 3(b) show, in side view, a vehicle comprising the example of FIG. 1 in undeployed configuration and deployed configuration, respectively.
Figure 3B:
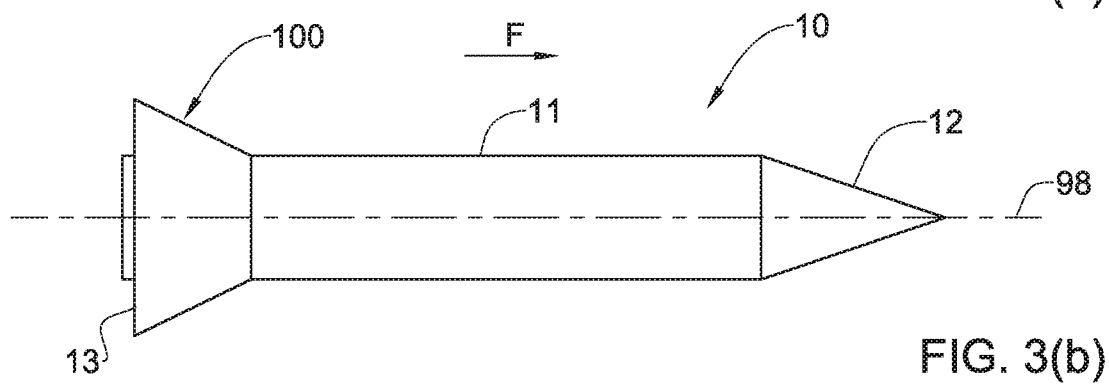

Referring also to FIGS. 3(a) and 3(b), the vehicle 10, by way of non-limiting example, can be an air vehicle, for example a projectile, missile or the like, and that is fired from a weapons barrel, for example. In this example, the vehicle 10 comprises an elongate cylindrical body 11, having a forward end 12, and a blunt aft end 13, which can comprise a propulsion unit, for example one or more rocket engines. However, the flare module 100 is also applicable to any other suitable type of vehicle in flight, whether manned or unmanned, and/or whether powered or unpowered, mutatis mutandis. The flare module 100 is also applicable to any other suitable type of vehicle with respect to any fluid medium M, particularly in motion in air, or any other suitable fluid medium, mutatis mutandis, including, for example, winged vehicles, and so on.

While in this example the forward end 12 includes a warhead (not shown) as well as a homing mechanism (not shown) and steering mechanism (not shown) for steering the vehicle 10 to a desired target, in alternative variations of this example the forward end 12 can include only one or only two of the aforesaid warhead, homing mechanism and steering mechanism, and/or sensors or other equipment. Alternatively, forward end 12 can instead accommodate any other suitable payload, or instead be in the form of an empty shell.

In any case, the flare module 100 is manipulable at least for being deployed from a non-deployed configuration (also referred to as a stowed configuration or as the undeployed configuration) to a deployed configuration. In the non-deployed configuration, the flare module 100 can be generally aligned with the air stream (or alternatively may be projecting into the air stream at a minimum flare angle), in order to minimize drag, while in the deployed configuration, the flare module 100 projects into the air stream (at a larger flare angle, up to a maximum flare angle) in such a way as to move the center of lift of the air vehicle 10 in an aft direction, from a first position to a second position. The manipulable flare module 100 includes a load bearing structure 140, said structure 140 being configured for mounting to the vehicle 10, in this example near to the aft end 13 thereof.

In general, the flare module 100 is configured for deploying from the non-deployed configuration to the deployed configuration after the projectile has been fired from a weapons barrel.

In alternative variations of this and other examples of the presently disclosed subject matter, the apparatus can be of a different form and instead operate to move the center of lift of the air vehicle 10 in a forward direction, from the first position to the second position.

In alternative variations of this and other examples of the presently disclosed subject matter, the flare module can be located at any other desired location along the air vehicle in the longitudinal direction, and in the same or reversed orientation longitudinally, and/or can be used for different purposes with respect to the air vehicle, for example as an air brake.

In operation, with the air vehicle 10 travelling through the fluid medium M (in this and other examples disclosed herein, the fluid medium being atmospheric air) the flare module 100 provides the air vehicle 10 with a capability for changing the position of the center of lift with respect the air vehicle 10, and transmits a moment thereto via load bearing structure 140. In at least one example, the load bearing structure 140 includes an annular ring-like load bearing member 142 that is adapted for being attached to the vehicle 10 in a manner such as to transmit loads and moments therebetween.

The flare module 100 defines a reference axis in the form of longitudinal axis 99 passing through the geometric center of the load bearing member 142, and which in general is aligned with the longitudinal axis 98 of the vehicle when mounted thereto.

In this example the external walls 115 are in the form of flare assembly 110, and the external walls 115 are deployable or otherwise movable from an undeployed configuration to a deployed configuration responsive to the body 200 being inflated from a deflated configuration to an inflated configuration via said inflation system 300.

Figure 4:
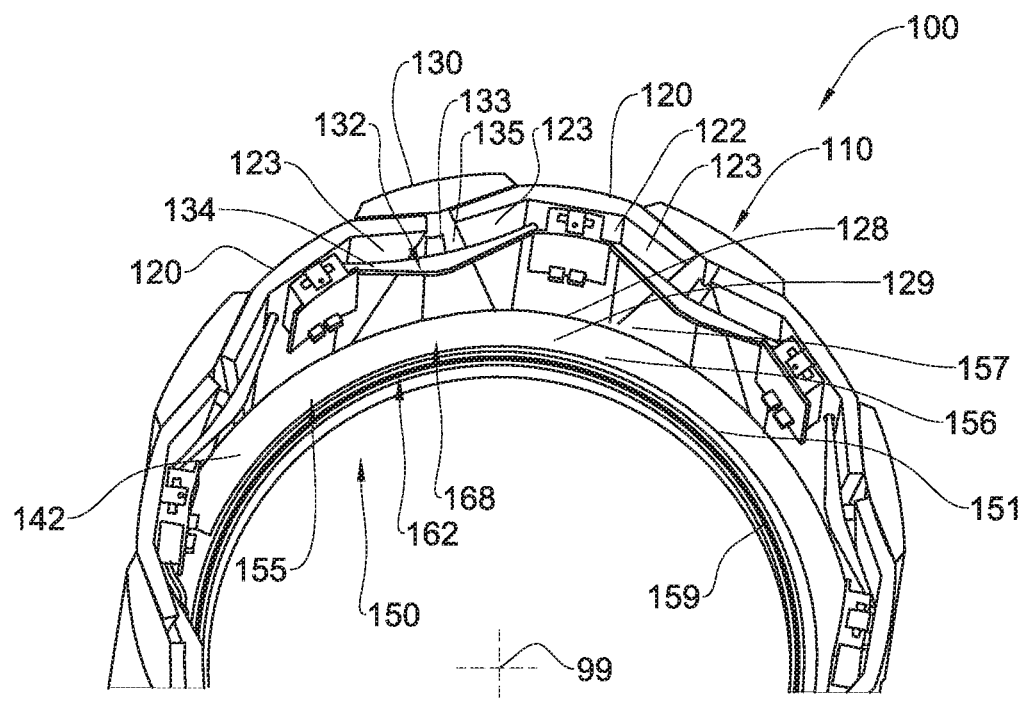
FIG. 4 shows, in rear perspective partial view, the example of FIG. 1, in undeployed configuration, absent the inflatable body.
Figure 5:
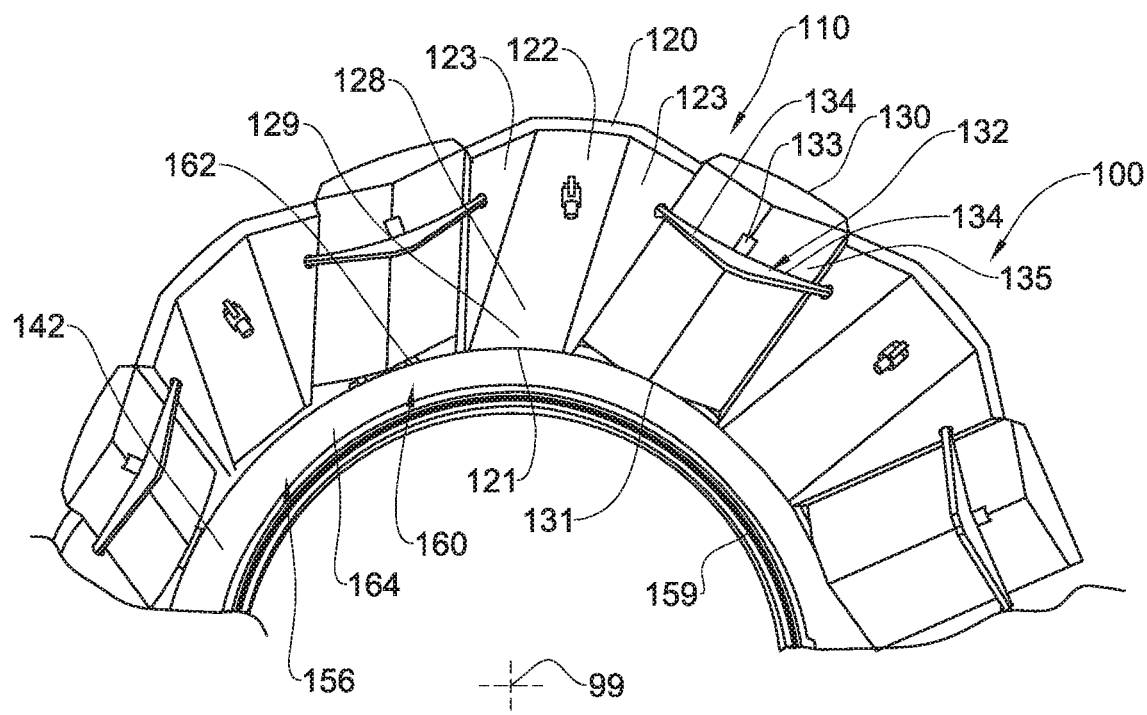
FIG. 5 shows, in rear perspective partial view, the example of FIG. 1, in deployed configuration, absent the inflatable body.

Referring also to FIGS. 4 and 5, the flare assembly 110 comprises a plurality of primary petals 120, and a plurality of secondary petals 130, which together define the external walls 115. In the illustrated example there are illustrated eight primary petals and eight secondary petals, though in alternative examples any suitable number of primary and secondary petals may be used; in yet other alternative examples the secondary petals may be omitted altogether; in yet other examples the primary petals may be replaced with struts, mutatis mutandis, and interconnected by means of any suitable covering (replacing the secondary petals), for example a fabric, material, foil, an accordion-like structure, or the like, having a relatively compact non-deployed configuration and capable of providing a generally frusto-conical form in the deployed configuration; in yet other examples the flare assembly may comprise a single primary petal.

In yet other examples, at least a portion of said external walls is elastic, deforming between a first shape corresponding to said deflated configuration and a second shape corresponding to said inflated configuration.

In yet other examples, said external walls comprise a plurality of rigid or semi rigid panels, wherein each pair of adjacent said panels are laterally joined to one another via a flexible interconnecting portion, wherein in said deflated configuration the interconnecting portions are in compact configuration, and wherein in the inflated configuration, the interconnecting portions are in expanded configuration.

Referring in particular to FIG. 2, the primary petals 120 and the secondary petals 130 are each hingedly mounted at a fore end thereof to the load bearing structure 140, in particular the load bearing member 142, via hinges 121, 131, to allow the primary petals 120 and the secondary petals 130 to pivot at least in an outwardly direction during the deployment operation of the flare module 100. The primary petals 120 and the secondary petals 130 are circumferentially arranged on load bearing member 142 in an alternating manner, such that each secondary petal 130 is adjacent two primary petals 120, one at each lateral side thereof, and similarly each primary petal 120 is adjacent two secondary petals 130, one at each lateral side thereof.

In the illustrated example the secondary petals 130 are generally rectangular in plan form, while the primary petals 120 are generally trapezoidal in plan form, though in alternative examples the opposite may be the case, and in yet other alternative examples other suitable combinations for the forms of the primary petals and secondary petals may be provided. In this example, and as best seen in FIGS. 4 and 5, the primary petals 120 may be faceted, and comprise a central, substantially rectangular elongate portion 122, and a generally triangular plate portion 123 at each lateral side thereof, wherein the latter are inclined at an angle to the central portion 122 such as to abut the underside of the respective adjacent secondary petals 130, at least in the non-deployed configuration. In alternative variations of this example, the primary petals 120 and the secondary petals 130 are each non planar, for example having curved outer facing surfaces, each of which forms part of a cone.

Furthermore, in this example the primary petals 120 and the secondary petals 130 are mechanically interconnected, i.e. coupled, to enable the primary petals 120 and the secondary petals 130 to deploy synchronously. For this purpose, each secondary petal 130 comprises a generally T-shaped guide member 132, having a stem 133 radially extending inwardly from the inner-facing side of the petal 130, and two arms 134 laterally projecting from the end of the stem 133. Each arm 134 defines a generally radial gap 135 into which the thickness of the adjacent triangular plate portion 123 of the adjacent primary petal 120 is received and which restricts relative movement between adjacent secondary petals 130 and primary petals 120 to a lateral sliding therebetween, i.e., in a generally circumferential manner.

In operation, as the flare assembly 110 is deployed from the undeployed configuration to the deployed configuration, the primary petals 120 and the secondary petals 130 synchronously pivot about their respective hinges, primary petals 120 and the secondary petals 130, 121 and 131, in view of the mechanical interconnection between each group of a primary petal 120 and its two adjacent secondary petals 130.

In alternative variations of this example, the primary petals 120 and the secondary petals 130 are not coupled to one another, and thus the guide members 132 can be omitted. In such a case, as the flare assembly 110 is deployed from the undeployed configuration to the deployed configuration, the primary petals 120 and the secondary petals 130 individually and independently pivot about their respective hinges under the action of the body 200.

The body 200 and inflation system 300 together form an actuation system for selectively deploying the external walls 115 when the flare module 100 is deployed from the undeployed configuration to the deployed configuration.

The body 200 (also referred to interchangeably herein as an inflatable member or as an inflatable body or as an expandable member or as an expandable body), is expandable from a non-expanded configuration to an expanded configuration, responsive to actuation thereof via the actuation mechanism, which in this and other examples of the presently disclosed subject matter is in the form of an inflation system, such as for example inflation system 300. In particular, and referring to FIGS. 6 and 7, body 200 is inflatable, via the inflation system 300, from the deflated configuration illustrated in FIG. 7 having a first volume V1, to an inflated configuration illustrated in FIG. 6 having a second volume V2, said second volume V2 being greater than said first volume V1.

In this example, the body 200 has a generally toroidal shape, and comprises an outer skin 210, enclosing an inner space S that is fillable by a fluid, typically a gas, selectively provided by the inflation system 300 when actuated, to increase the volume of the body 200 inflation system 300 from first volume V1 to second volume V2. The body 200 further comprises at least one conduit 220 providing selective fluid communication between the inflation system 300 and the inner space 200. Optionally, a non-return valve 230 can be provided in the at least one conduit 220 for preventing backflow of the gas or other fluid out from the body 200 once the inflation system 300 ceases to provide the required inflation pressure.

Figure 7:
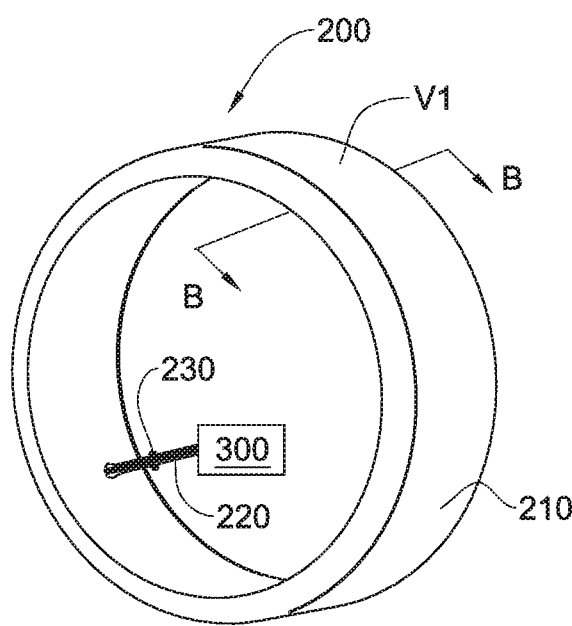
FIG. 7 shows, in rear perspective partial view, the inflatable body of the example of FIG. 1, in deflated configuration.
Figure 7A:
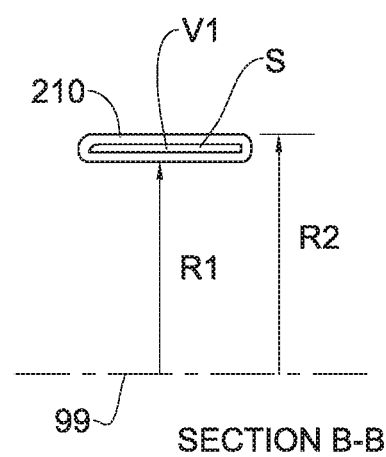
FIG. 7(a) illustrates in transverse cross-sectional side view the example FIG. 7, taken along B-B.

In this example, and referring to FIGS. 7 and 7(a), in the deflated state the body 200 has a tubular-like shape, having an internal radius R1 taken from the longitudinal axis 99, and an external radius R2. For example, the difference between s external radius R2 and internal radius R1 can be double the thickness t of the skin 210, and thus the inner space S is nominally zero, or at least occupies a minimum volume.

Figure 6:
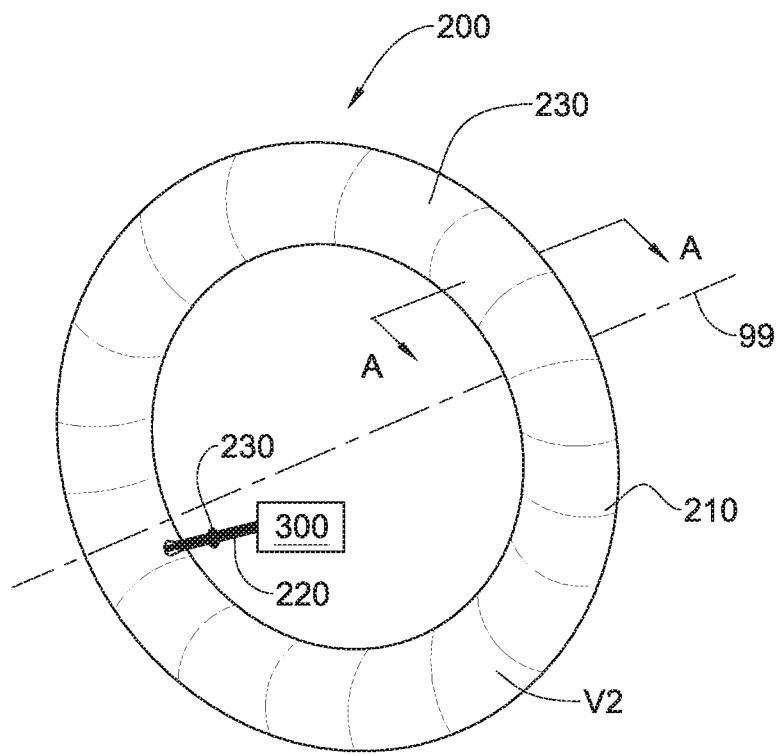
FIG. 6 shows, in rear perspective partial view, the inflatable body of the example of FIG. 1, in inflated configuration.
Figure 6A:
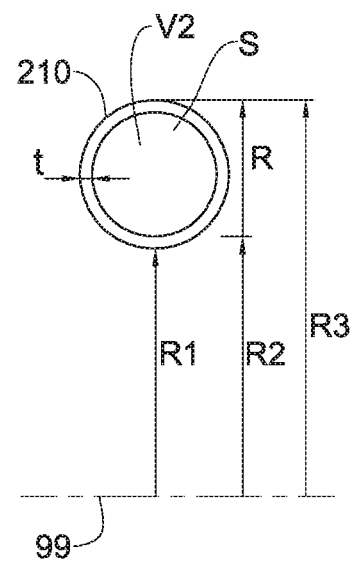
FIG. 6(a) illustrates in transverse cross-sectional side view the example FIG. 6, taken along A-A.

In the inflated configuration the body 200, and referring to FIGS. 6 and 6(a), has a generally toroidal shape in which the cross section is now generally circular (or other suitable cross-section shape—for example oval polygonal etc.) and uniform along a circumferential direction about the axis 99, though other shapes are of course possible.

In this example the body 200, in particular the skin 210, is formed from a suitable non-elastic and non-rigid material—for example this allows the body to be folded multiple times, or can be in an accordion shape (for example having a bellows-type body), and is expanded to the deployed configuration without any significant stretching or change in the surface area of the body skin 210. Alternatively, and in other variations of this example, the body 200, in particular the skin 210, is formed from an elastic material, that itself stretches when the body 200 is inflated. Thus, in the inflated configuration, the surface area of the skin 210 can be significantly larger than in the deflated configuration.

In any case, it is to be noted that while in the inflated configuration while the body 200 has substantially the same inner radius R1 as in the deflated configuration, the external radius R3 in the inflated configuration is considerably larger than the external radius R2 in the deflated configuration.

As the body 200 becomes inflated, the radial dimension thereof increases by an amount R (see FIG. 6(a) and FIG. 7(a)), corresponding to the difference in external radius R3 and external radius R2, driving the external walls 115 from the undeployed configuration to the deployed configuration.

For example, external radius R2 is such that in the undeployed configuration the external walls 115 are within a cylindrical envelope having a diameter that is within ±10% of a baseline diameter, wherein the baseline diameter is a diameter of the air vehicle 10 immediately forward of the flare module 100 when the flare module 100 is mounted to the air vehicle 10.

In this example, the body 200 fits over tubular aft internal casing 188 of the air vehicle, and thus inner radius R1 is just greater than an outer radius of the aft internal casing 188. The aft internal casing 188 projects in an aft direction from the load bearing structure 140.

In alternative variations of this example, in which the air vehicle does not have an aft internal casing 188, a non-inflatable permanent plug or other support structure can be provided in the center of the body 200, similar in external geometric form to the aft internal casing 188 to maintain the body 200 aligned with axis 99. Alternatively the body 200 can include an inflatable plug provided in the center of the body 200, which is inflated concurrently or prior to inflation of the toroidal body to provide an external geometric form similar to that of the aft internal casing 188 to maintain the body 200 aligned coaxially with axis 99. Alternatively the body 200 is non-toroidal, and is formed without a central opening, for example having a as a suitable body of revolution with respect to axis 99, for example a sphere, hemisphere, ellipsoid, and so on.

In this example, the body 200, in particular an outer portion 230 of the body 200 is in mechanical contact with an inside of the flare assembly 110. For example the body 200 is not affixed to the primary petals 120 or to the secondary petals 130, and merely pushes against one or more of the primary petals 120 and/or to one or more of the secondary petals 130, when inflated to the inflated configuration to thereby deploy the external walls to the deployed configuration.

Alternatively, the outer portion 230 can be affixed to the inside if the flare assembly 110, for example to one or more of the primary petals 120 and/or to one or more of the secondary petals 130. Such affixing can be via suitable adhesive and/or a mechanical fastening system (not shown), for example.

In any case, as the body 200 becomes inflated from the deflated configuration to the inflated configuration, the body 200 radially pushes in an outward radial direction against the inside surfaces of the flare assembly 110, thereby deploying the external walls 115, in particular the primary petals 120 and the secondary petals 130, from the undeployed configuration of FIG. 2 to the deployed configuration of FIG. 1, and thereby concurrently shifting the center of pressure for the air vehicle 10 from the first position to the second position when the air vehicle is travelling in a forward direction F at predetermined operating conditions including an operating airspeed for the air vehicle that is greater than a threshold airspeed. For example, the threshold airspeed can be a minimum airspeed at which it is considered advisable to shift the center of pressure for the air vehicle 10 from the first position to the second position.

Thus, in the deployed configuration the flare module 100 becomes flared, having an increasing transverse cross section along the aft longitudinal direction, at least as compared with the undeployed configuration.

Furthermore, in this and other examples, the flare module 100 is generally axisymmetric, and thus also deployed in a uniform axisymmetric manner to the deployed configuration.

In alternative variations of this example, the single toroidal body 200 can be replaced with a toroidal body having a non-uniform cross-section in a circumferential direction and/or in the longitudinal direction—for example in the form of an accordion in which the two ends thereof are joined together to form a ring shape. In yet other alternative variations of this example, the single toroidal body 200 can be replaced with two or more inflatable bodies, distributed axially and/or circumferentially on the inside of the flare assembly 200. For example, the body 200 can instead comprise a plurality of balloon type bodies, in fluid communication with one another and/or in selective fluid communication with the inflation system 300, wherein a group of one or more such balloon type bodies abuts against (and optionally is affixed to) the primary petals 120 and/or the secondary petals 130, such that inflation of the balloon type bodies urges the petals outwardly to deploy the flare module 100.

Optionally, the body 200 can be shaped or otherwise configured for facilitating expansion thereof in the radial direction preferentially. For example, the body 200 can optionally comprise radial ribs.

In any case, the body 200 in this example (or alternative variations thereof) is accommodated snugly between the inside of the flare assembly 110 and the outside of the aft internal casing 188 in the deflated configuration, such as, on the one hand, to allow the external walls 115 to adopt a minimum drag position, illustrated in FIG. 2, for example, while on the other hand the body 200 is configured to expand at least radially to thereby urge the outer walls 115 into a deployed configuration sufficient to correspondingly change the position of the center of pressure of the air vehicle 10.

It is evident that at least in the first example, and at least in some of the alternative variations thereof, the body 200, in the form of an expansion member, in particular in the form of the inflatable member, is different from and independent of the external walls 115 of the flare module.

Figure 8:
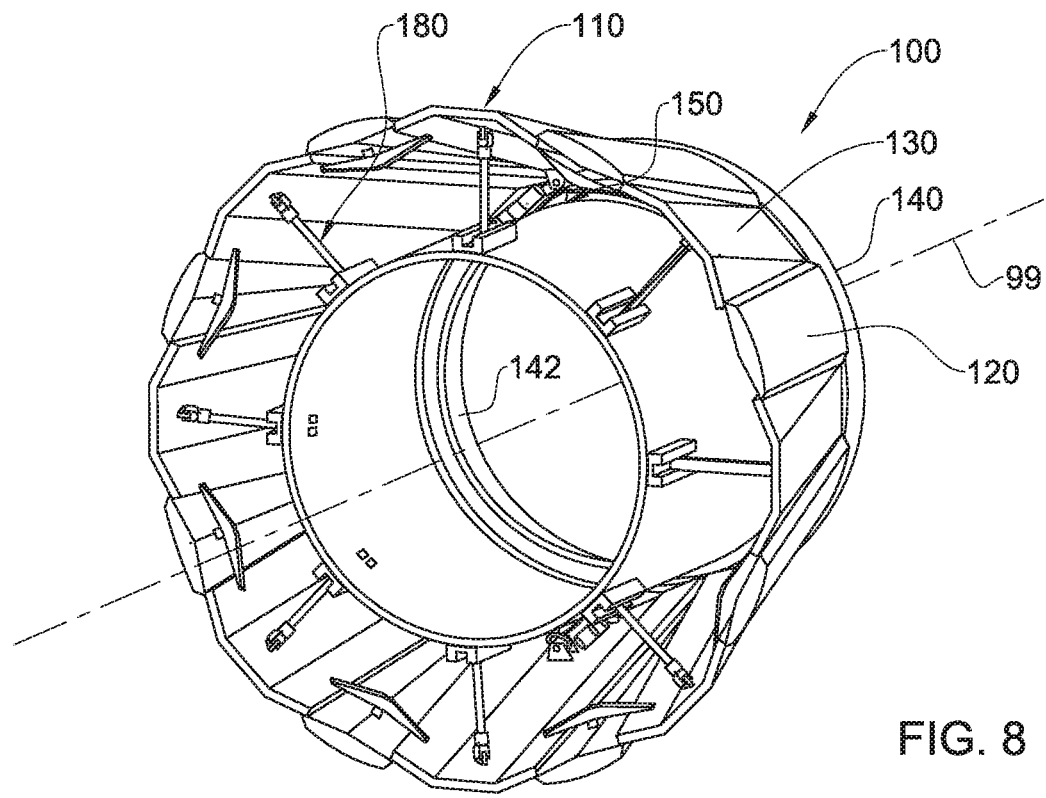
FIG. 8 shows, in rear perspective partial view, the example of FIG. 1, in deployed configuration, absent the inflatable body, and including an example of a locking mechanism.

Optionally, and referring in particular to FIG. 8, in this example, the flare module 100 can further comprise a locking mechanism 180 for locking the flare assembly 110 in the deployed configuration. In this figure the body 200 has been removed for providing more clarity. The locking mechanism 180 comprises a plurality of struts 182, each strut 182 hingedly mounted at one end thereof to the inner facing side of the respective primary petal 120 at a position aft of the respective hinge 121. The other end 185 of each strut 182 is configured for sliding in a generally axial manner within a guide box 184. Each guide box 184 is configured for being mounted to the aft end of the vehicle 10, in radial registry with the respective primary petal 120, and comprises a pair of transversely spaced, generally axial rails 186, and a transverse pin or roller arrangement (not shown) at the strut end 185 is constrained for sliding along rails 186 during operation of the flare module 100, such that in the non-deployed configuration at least a part of the strut 182 is accommodated in the generally longitudinal spacing between the respective pair of rails 186 and the pin or roller arrangement is at the aft end of guide box 184, while as the flare module 100 is being deployed, the pin or roller arrangement translates in a forward direction to a fore position, where a suitable lock arrangement (not shown) locks the pin or roller arrangement at the position corresponding to the fully deployed configuration. The lock arrangement may comprise, for example, a mechanical latch, detent, wedge, and so on, for example, that prevents the pin or roller arrangement to translate back in an aft direction after it has reached the aforesaid fore position thereof. In such a case it is possible but not necessary for the body 200 to be maintained in the inflated configuration after it has reached the inflated configuration. Rather, once the body 200 has been inflated to the inflated configuration, and the locking mechanism 180 is locked in place, it is possible for the body 200 to deflate, while the external walls 115 will still remain in the deployed configuration.

In variations of this example, the locking mechanism can be omitted, for example where the body 200 remains inflated after attaining the inflated configuration.

In operation, the body 200 is selectively inflated from the deflated configuration to the inflated configuration via the action of the inflation system 300. Thus, the inflation system 300 is configured for selectively inflating the body 200 from the deflated configuration to the inflated configuration, and for example comprises a fluid supply, typically a pressurized gas, that can be selectively driven into the body 200 for inflating the same. Thus, the body 200 is designed to inflate against a resistance to such inflation that may be applied to the body 200 via the external walls 115 by the airflow over the flare module 100, and the inflation system 300 is designed to provide sufficient inflation pressure and/or fluid mass flow to the body 200 to ensure inflation of the body 200 under such conditions.

Figure 9:
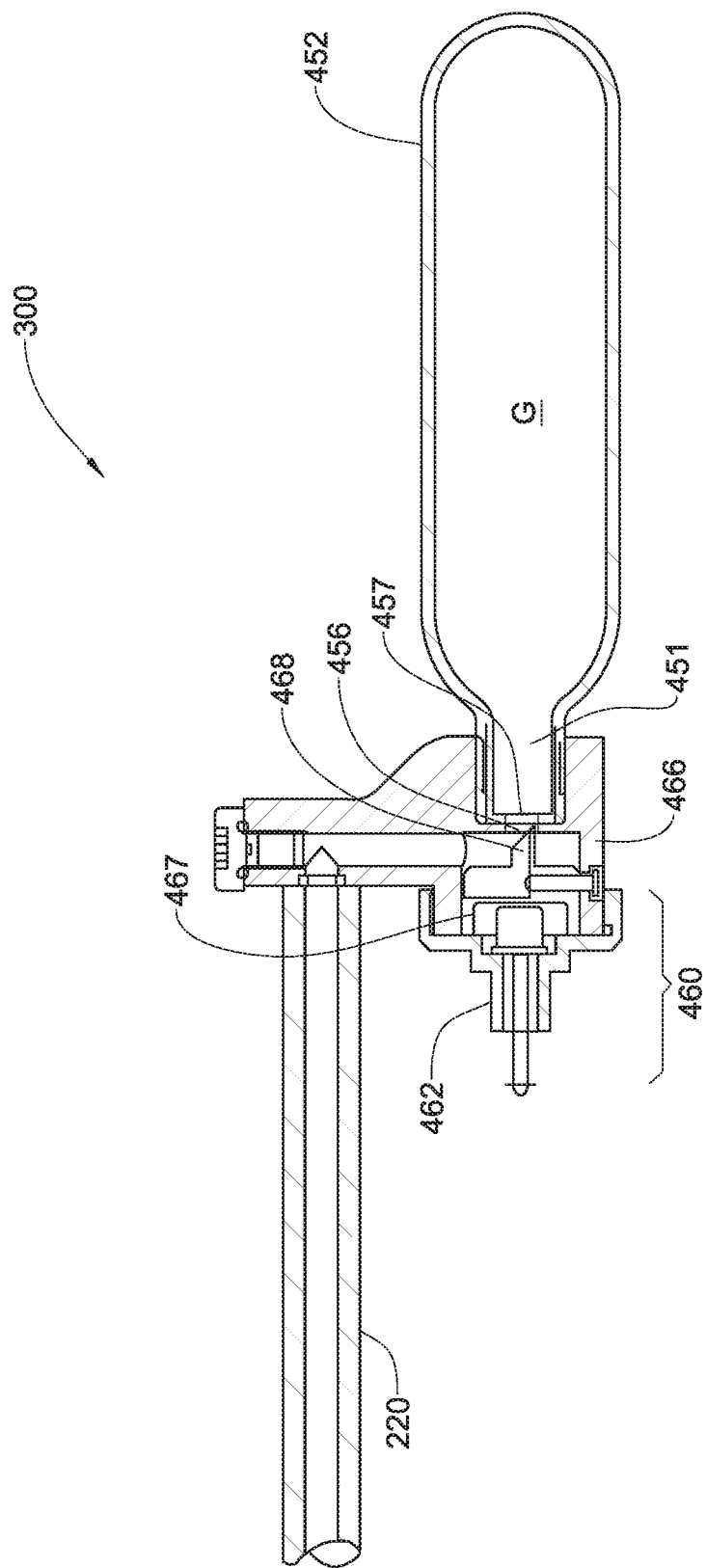
FIG. 9 illustrates in longitudinal cross-sectional side view an example of an inflation system according to the presently disclosed subject matter, for example comprised in the example of FIG. 1.

Referring to FIG. 9, a first example of the inflation system 300 comprises a pressurized gas vessel 452 (containing a suitable pressurized gas G, for example nitrogen, carbon dioxide, etc.) under positive gauge pressure) in selective fluid communication with body 200 via a conduit 220 and actuable valve 456. Thus, the pressurized gas vessel 452 has an outlet 451 connected to an inlet of the body 200 via conduit 220. Valve 456 is a one-time valve and is in the form of a puncturable or otherwise rupturable membrane 457 provided at the outlet 451. The inflation system 300 further comprises an actuation arrangement 460, including a piercing member 468, for example a sharp pin, blade or knife, driven by a piston 467, which is in turn reciprocable within a chamber 466 between a distal position and a proximal position. In the distal position, illustrated in FIG. 9, the piercing member 468 is spaced from the membrane 457, which is intact, and thus the pressurized gas G remains in the pressurized gas vessel 452. In the proximal position, the piercing member 468 is in a position to puncture or otherwise pierce the membrane 457, thereby allowing the pressurized gas G in the pressurized gas vessel 452 to flow to the body 200, through the hole or puncture, via the conduit 220, and thereby inflate the body 200.

In alternative variations of this example pressurized gas vessel can be replaced with any suitable generator of gas, foam or other suitable fluid that is configured for generating quickly a large volume of corresponding fluid that can easily and quickly be fed to the body 200 and to thereby increase the internal volume thereof to volume V2.

The actuation arrangement 460 also includes a driver 462 for selectively driving the piston 467 from a distal position to a proximal position, to thereby pierce the membrane 457. In this example, the driver 462 is in the form of a pyrotechnic actuator including a pyrotechnic charge that can be fired on receipt of a suitable signal from a controller (not shown) comprised in the flare module 100. Firing of the pyrotechnic charge results in a force being induced to the piston 467, which is thereby driven in a proximal direction, driving the piercing member 468 to puncture or otherwise rupture the membrane 457, thus allowing the body 200 to become inflated. In alternative variations of this example, the pyrotechnic driver can be replaced with any other suitable driver, for example an electrically driven driver (e.g. a linear motor).

It is evident that at least in the first example, and at least in some of the alternative variations thereof, inflation system 300 can be selectively operated to provide fast deployment of the flare module to the deployed configuration.

It is evident that at least in the first example, and at least in some of the alternative variations thereof, inflation system 300 can be selectively operated to provide reliable deployment of the flare module to the deployed configuration.

It is evident that at least in the first example, and at least in some of the alternative variations thereof, inflation system 300 can be easily installed in the flare module 100 to enable deployment of the flare module 100 to the deployed configuration.

It is evident that at least in the first example, and at least in some of the alternative variations thereof, body 200 and/or the inflation system 300 can be easily replaced in the flare module 100 (for example in case of malfunction of the body 200 and/or the inflation system 300) to enable deployment of the flare module 100 to the deployed configuration.

It is evident that at least in the first example, and at least in some of the alternative variations thereof, inflation system 300 is essentially self-contained and operates in a self-contained manner to expand the body 200 from an unexpanded form to an expanded form, to thereby enable, when installed in the flare module 100, deployment of the flare module 100 to the deployed configuration.

It is to be noted that, in at least some variations of this example, the flare module 100, in particular the inflation system 300, can be configured for providing deployment thereof from the undeployed configuration to the deployed configuration within a desired deployment time, which for example can be pre-set at the factory, or just prior to firing/launching the air vehicle 10. For example, referring to FIG. 9, the piercing member 468 is formed as a needle or wedge-shaped blade having a sharp tip facing the membrane 457, and the inflation system 300 can be configured for enabling controlling the depth of penetration of the piercing member 468 through the membrane 457, and thereby controlling the size of the open area of the puncture or rupture in the membrane 457 (due to the increasing cross-sectional area of the piercing member 468 in a direction away from the tip), when punctured or otherwise ruptured by the piercing member 468. In turn, the larger this open area is, the faster the pressurized gas G is released to the body 200, and thus the faster the body 200 becomes fully inflated, and thus the shorter the corresponding deployment time. Conversely, the smaller this open area is, the slower the pressurized gas G is released to the body 200, and thus the slower the body 200 becomes fully inflated, and thus the longer the corresponding deployment time. The size of the open area made by piercing member 468 in the membrane 457 can be controlled in a number of different ways. For example, a mechanical stop (not shown) can be provided to limit the travel of the piston 467 or to limit the travel of the piercing member 468 in the proximal direction, and thereby limit the penetration of the piercing member 468 through the membrane 457, which in turn limits the size of the open area of the hole or other rupture formed in the membrane 457. It is also possible to configure this mechanical stop such that its position, with respect to piston 467 or to piercing member 468 in the proximal direction, can be adjusted. In this manner, the mechanical stop can be moved towards or away from the membrane 457, either at the factory or via a suitable mechanism accessible by a user prior to firing/launching the air vehicle, thereby pre-setting the deployment time.

Operation of the flare module 100 when mounted to air vehicle 10 can be as follows, for example:

In a first step, the air vehicle 10 comprising the flare module 100 is fired from a weapons barrel (if the air vehicle is in the form of a shell for example), with the flare module 100 in the retracted or undeployed configuration.

In the next step, at a predetermined set of conditions, the flare module 100 is deployed to the deployed configuration by activating the inflation system 300, particularly via the actuation arrangement 460. Essentially, the pyrotechnic charge is fired, resulting in a force being applied to the piston 467, which is thereby driven in the proximal direction, driving the piercing member 468 to rupture the membrane 457, releasing pressurized gas G to the body 200 and thus allowing the body 200 to become inflated. As the body 200 becomes inflated, its radial dimension increases, thereby radially and circumferentially pushing apart the primary petals and the secondary petals from one another, which results in the flare module 100 being deployed to the deployed configuration.

The predetermined set of conditions can include, for example, a predetermined time after firing/launch of the air vehicle, and/or a rate of velocity or acceleration of the air vehicle, that indicate that the center of pressure of the air vehicle needs to be shifted to the second position. Additionally or alternatively, the predetermined set of conditions can include, for example, the air vehicle having reached a particular height, and/or range. Thus, suitable condition-determining devices (for example: an altimeter for sensing the height of the air vehicle; an inertial system for sensing distance travelled; an accelerometer for sensing acceleration of the air vehicle; a timer for determining elapsed time from firing/launch) can be provided and operatively coupled to the actuation arrangement 460 for activation thereof. Where there are different alternative sets of conditions that do not coincide, a suitable controller and/or algorithm can be provided to choose between the different alternative sets of conditions.

It is to be noted that at least in one variation of this example, the specific predetermined set of conditions can be set at the factory, or alternatively prior to firing/launching the air vehicle, or alternatively after firing/launching the air vehicle (e.g. the flight on board computer can include suitable algorithms and or rules for determining when to deploy the flare module 100 to the deployed configuration, and/or, an external controller (human or computer) can transmit suitable command signals to the air vehicle to cause the flare module 100 to be deployed to the deployed configuration). For example, the condition-determining devices and/or controller/algorithms can be adjusted to enable actuation of the inflation system 300, in particular the actuation arrangement 460 at different sets of conditions.

In at least some examples of the presently disclosed subject matter, the apparatus can be ejected from the air vehicle.

In alternative variations of the first example, the apparatus is configured for enabling the flare module to be manipulable for being selectively set at any desired flare setting (corresponding to a desired flare angle), comprising any desired intermediate configuration ranging between the fully deployed configuration and the undeployed configuration, and thus having an intermediate flare angle less than the maximum flare angle that corresponds to the deployed configuration. For example, the inflation system 300 can be configured for selectively partially or fully inflating the body 200 for selectively controllably partially or fully deploying the flare module to the deployed configuration, i.e., to provide any desired flare angle (also referred to interchangeably herein as the deployment angle) between the minimum deployment angle, corresponding to the undeployed configuration, to the maximum deployed angle, corresponding to the fully deployed configuration. Optionally, the inflation system 300 can be configured for providing any such desired partial deployment, starting from a more deployed configuration having a larger deployment angle, such as to reduce the deployment angle, or starting from a less deployed configuration, having a smaller deployment angle. For example, in such alternative examples the inflation system 300 can comprise a controllable vent valve in selective communication with the body 200, for example located in conduit 220, which is controllably actuable such as to selectively vent the body 200 and thus retract the external walls 115 towards the undeployed configuration. In such a case, the body 200 is affixed to the primary petals 120 and/or to the secondary petals 130. Such alternative variations of the first example can find particular use in applications wherein the air vehicle on which the apparatus according to the presently disclosed subject matter is mounted can be controlled in a manner in which the static margin and/or the velocity and/or the drag thereof needs to be controllably varied as desired between two particular limits, a first limit corresponding to full deployment configuration of the apparatus, and a second limit corresponding to the undeployed configuration of the apparatus. For example, such alternative examples allow for the static margin to be varied, which may be desirable in applications of the presently disclosed subject matter in which the static margin would otherwise vary significantly due to loss of propellant during powered flight, for example, or in the case of a multistage vehicle, every time another stage is jettisoned. In some such alternative examples, the deployment angle may be varied in real time in response to changes in conditions, and optionally in either direction.

As already mentioned, at least in the first example, and at least in some of the alternative variations thereof, the body 200 is different from and independent of the external walls 115 of the flare module 100. Furthermore, the shape of the body 200, particularly in the inflated configuration, does not require to conform to the geometry of the external surfaces of the external walls 115 that are exposed to the airflow. It is only sufficient that the manner in which the body 200 changes geometry when inflated to the inflated configuration (in particular by increasing an outer radius thereof while pushing outwardly against the external walls 115) enables the external walls to be deployed to the deployed configuration and interact aerodynamically with the airflow to produce an aerodynamic effect, in this example to change the position of the center of pressure.

Referring to FIGS. 10 to 13, an apparatus for controlling the motion of a vehicle 10 in a fluid medium M, according to a second example of the presently disclosed subject matter, is also in the form of a flare module, generally designated herein with reference numeral 1100, and comprises external walls 1115, an expandable body in the form of an inflatable body 1200, and actuation mechanism in the form of an inflation system 1300, similar to the flare module 100, external walls 115, inflatable body 200 and inflation system 300, respectively, of the first example or alternative variations thereof, as disclosed above, mutatis mutandis, with some differences, as will become clearer herein.

In general, the flare module 1100 is configured for deploying from the non-deployed configuration to the deployed configuration after the projectile has been fired from a weapons barrel.

In the second example of the presently disclosed subject matter, the shape of the body 1200, particularly in the inflated configuration, provides directly or indirectly the required geometry for the external surfaces of the external walls 1115 that are exposed to the airflow, since the external walls are now provided by the body 1200 itself. Thus, as the body 1200 changes geometry when inflated to the inflated configuration from the deflated configuration enables the external walls 1115 to be deployed to the deployed configuration and interact aerodynamically with the airflow to produce an aerodynamic effect, in this example to change the position of the center of lift control of the air vehicle 10.

As with the first example and at least some alternative variations thereof, the flare module 1100 transmits a moment to the air vehicle 10 via load bearing structure 1140, for example similar to the load bearing structure 140 as disclosed herein, mutatis mutandis. Furthermore, the flare module 1100 defines reference axis in the form of longitudinal axis 199 passing through the geometric center of the load bearing structure 1140, and which in general is aligned with the longitudinal axis 98 of the vehicle 10 when mounted thereto.

In this example the external walls 1115 are integral with or attached to the body 1200, and the external walls 1115 are deployable or otherwise movable from an undeployed configuration to a deployed configuration responsive to the body 1200 being inflated from a deflated configuration to an inflated configuration via said inflation system 1300.

Figure 10:
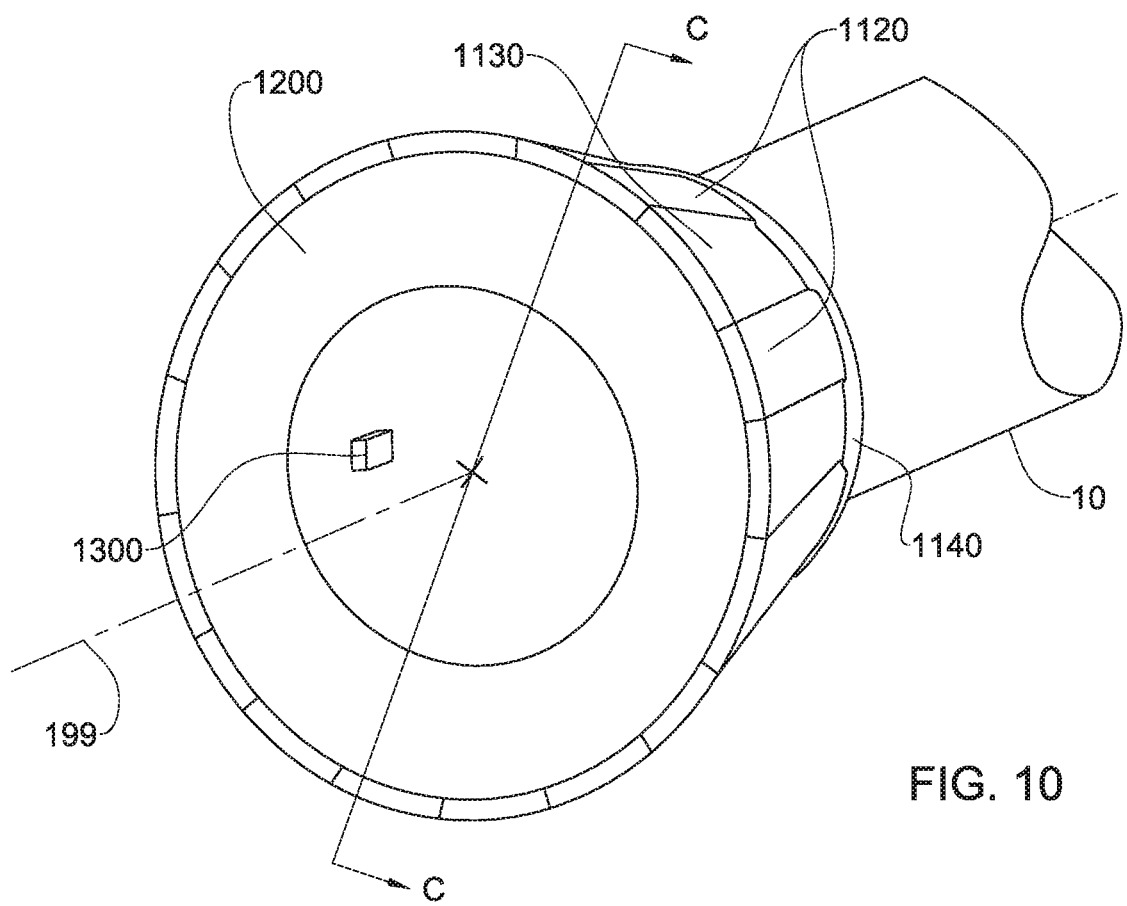
FIG. 10 shows, in rear perspective view, an apparatus according to the second example of the presently disclosed subject matter, in deployed configuration.
Figure 11:
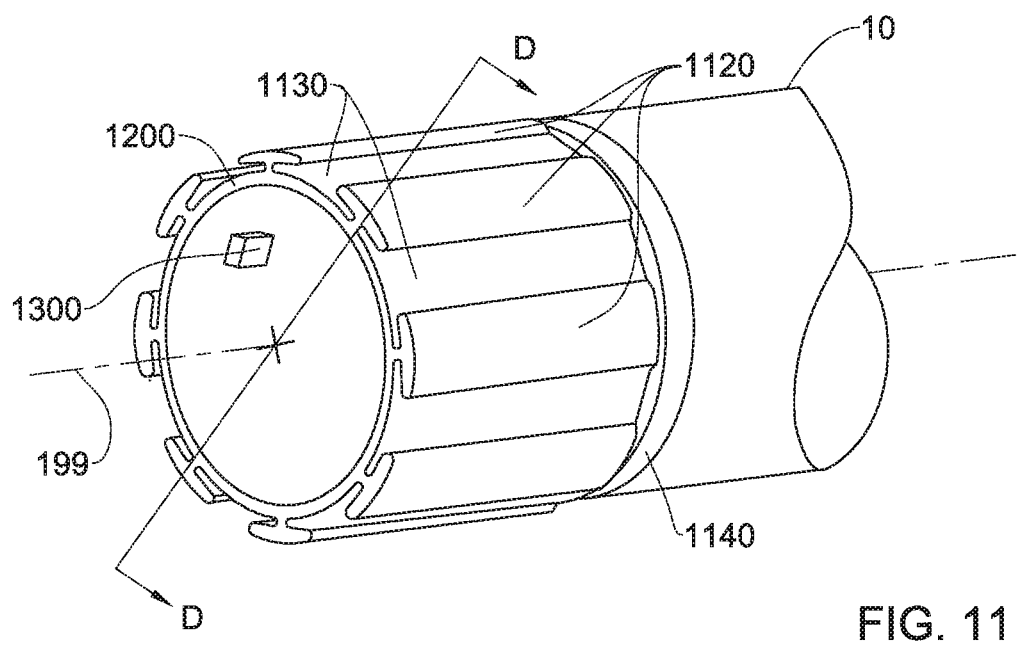
FIG. 11 shows, in rear perspective view, the example of FIG. 10, in undeployed configuration.

Referring in particular to FIGS. 10 and 11, the external walls 1115 comprises a plurality of panels (also referred to interchangeably herein as petals), including a first set of primary panels 1120, and a second set of secondary panels 1130, which together define the external walls 1115. In the illustrated example there are illustrated eight primary panels 1120 and eight secondary panels 1130, though in alternative examples any suitable number of primary and secondary panels may be used.

The primary panels 1120 and the secondary panels 1130 are circumferentially arranged with respect to the body 1200, and also with respect to the load bearing structure 1140 in an alternating manner, such that each secondary panel 1130 is adjacent two primary panels 1120, one at each lateral side thereof, and similarly each primary panel 1120 is adjacent two secondary panels 1130, one at each lateral side thereof.

Thus, in this example, the primary panels 1120 and secondary panels 1130 are each separate from the body 1200.

Referring in particular to FIG. 11, the primary panels 1120 can optionally be hingedly mounted at a fore end thereof to the load bearing structure 1140, via hinges to allow the primary panels 1120 to pivot at least in an outwardly direction during the deployment operation of the flare module 1100. Alternatively, the primary panels 1120 are not thus hinged, and instead pivot at least in an outwardly direction during the deployment operation of the flare module 1100 as a result of inflation of the body 1200, and the inflated shape thereof, as will become clearer herein.

In the illustrated example the primary panels 1120 are generally rectangular in plan form, while the secondary panels 1130 are generally trapezoidal in plan form in the deployed configuration. In alternative variations of this example the opposite can be the case, and in yet other alternative examples other suitable combinations for the forms of the primary panels and secondary panels may be provided.

Furthermore, in this example, the primary panels 1120 are generally planar, though can instead be faceted. In alternative variations of this example, the primary panels 1120 are non-planar, for example having curved outer facing surfaces, each of which forms part of a cone.

In this example, the primary panels 1120 are relatively rigid, though alternatively, the primary panels 1120 can be semi-rigid or flexible. In any case, the primary panels 1120 are sufficiently stiff such as to maintain the geometrical shape of the outer surface thereof, at least in the deployed configuration. This stiffness can be inherent in the primary panels 1120, or can be provided by the body 1200 when inflated to the inflated configuration.

In this example, the primary panels 1120 are exposed to an external airflow over the air vehicle 10, in the deployed configuration, as well as in the undeployed configuration, at least just prior to deployment. For example, the flare module 1100 in this example (and optionally also the flare module according to the first example or alternative variations thereof) can optionally comprise a cover (not shown), for example tubular in shape, that covers the external walls 1115 until deployment, and the cover is ejected just before the flare module 1100 is deployed.

In this example, the secondary panels 1130 are separate from the body 1200 and can comprise any suitable flexible material, for example a fabric, material, foil, an accordion-like structure, or the like, having a relatively compact non-deployed configuration and capable of providing a generally frusto-conical form in the deployed configuration.

Furthermore, in this example the primary panels 1120 and/or the secondary panels 1130 are mechanically affixed to the body 1200 (for example via suitable adhesive, welding, and/or a mechanical fastening system (not shown)), to deploy synchronously with inflation thereof. As will become clearer herein, in operation, as the flare assembly 1110 is deployed from the undeployed configuration to the deployed configuration, the primary panels 1120 and the secondary panels 1130 effectively pivot outwardly to the deployed configuration, in view of the form of the body 1200 and the mechanical interconnection between the body 1200 and each of the primary panels 1120 and/or the secondary panels 1130.

The body 1200 (also referred to interchangeably herein as an inflatable member or as an inflatable body or as an expandable member or as an expandable body), is expandable from a non-expanded configuration to an expanded configuration, responsive to actuation thereof via the actuation mechanism, which in this and other examples of the presently disclosed subject matter is in the form of an inflation system, such as for example inflation system 1300 which can be similar to inflation system 300 as disclosed herein for the first example, mutatis mutandis. In particular, and referring to FIGS. 12 and 13, body 1200 is inflatable, via the inflation system 1300, from the deflated configuration illustrated in FIG. 13 having a first volume V1', to an inflated configuration illustrated in FIG. 12 having a second volume V2', said second volume V2' being greater than said first volume V1'.

In this example, the body 1200 has a generally toroidal shape, and comprises an outer skin 1210, enclosing an inner space S' that is fillable by a fluid, typically a gas, selectively provided by the inflation system 1300 when actuated, to increase the volume of the body 1200 inflation system 1300 from first volume V1' to second volume V2'.

Figure 14:
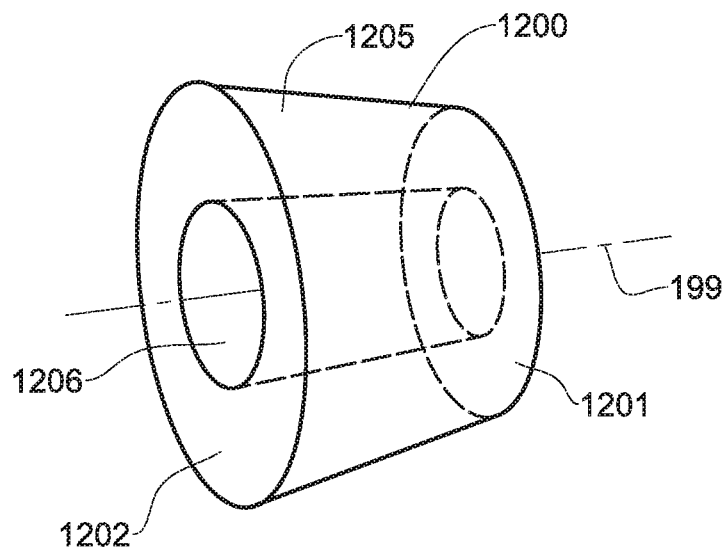
FIG. 14 shows, in rear perspective partial view, the inflatable body of the example of FIG. 10.

Furthermore, in this example, and referring also to FIG. 14, the body 1200 has a first longitudinal end 1201 (also referred to as the forward end), a second longitudinal end 1202 (also referred to as the aft end) longitudinally spaced from the first longitudinal end 1201, an outer wall 1205 and an inner wall 1206. The first longitudinal end 1201, the second longitudinal end 1202, the inner wall 1206 and the outer wall 1205 define inner space S'.

The inner wall 1206 is generally cylindrical, and fits over the over tubular aft internal casing 188 of the air vehicle.

In the inflated configuration, the first longitudinal end 1201, and the second longitudinal end 1202 are annular, but instead can have any other suitable shape for example having an outer perimeter that is polygonal.

In the inflated configuration, the first longitudinal end 1201 has a larger width dimension (i.e. orthogonal to the longitudinal axis 99), i.e., a larger outer diameter, than the second longitudinal end 1202.

In the inflated configuration, the outer wall 1205 has a generally frustoconical shape, or a faceted truncated pyramidal shape (pyramid frustrum), which in turn provides the required shape for the external walls 1150.

In the deflated configuration, the outer wall 1205 assumes a compact form. For example, and referring to FIG. 15(*a*) for example, outer wall 1205 can have a generally undulating form, including a plurality of lobes 1222, in which the crests 1223 of the lobes correspond to and can be mechanically affixed to the respective primary panels 1120, and in which the troughs 1224 of the lobes correspond to and can be optionally connected to the respective secondary panels 1130, which thus also follow the shape of the troughs.

Figure 15A:
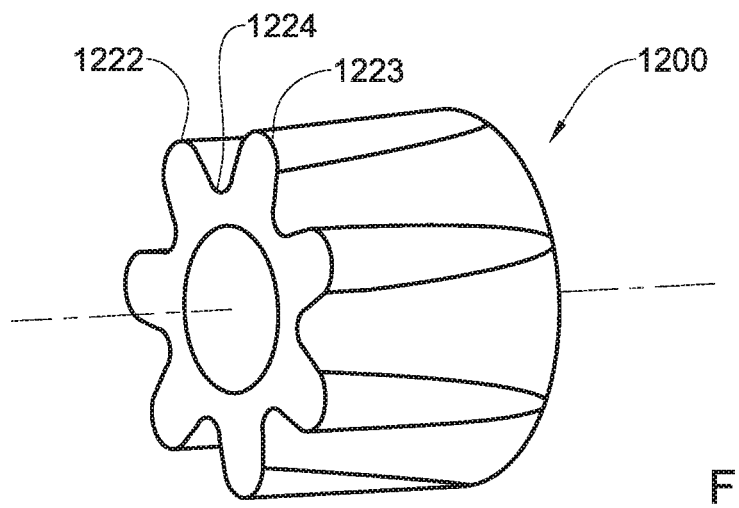
FIG. 15(a) shows, in rear perspective partial view, an alternative variation of the example of the inflatable body of the example of FIG. 10 in the deflated configuration.
Figure 15B:
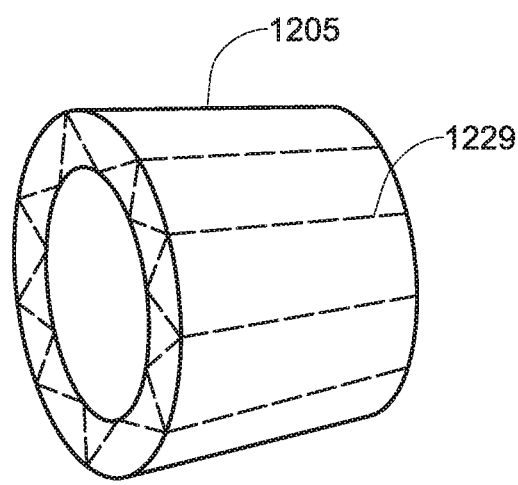
FIG. 15(b) shows, in rear perspective partial view, another alternative variation of the example of the inflatable body of the example of FIG. 10 in the inflated configuration.

Additionally or alternatively, for example, and referring to FIG. 15(*b*) for example, the outer wall 1205 in the deflated configuration is at least partially folded at a plurality of fold lines 1229, each such fold line can be at least partially aligned longitudinally, and in the inflated configuration parts of the outer wall 1205 unfold about the fold lines to provide the inflated form of the body 1200. The primary panels 1120 are mechanically affixed to respective parts of the outer wall 1205 between fold lines, while the secondary panels 1130 can optionally be connected to the respective parts of the outer wall 1205 corresponding to the fold lines.

Additionally or alternatively, for example, and referring to FIG. 11, the outer wall 1205 in the deflated configuration is generally at least partially mutual overlapped in a circumferential direction with respect to the longitudinal axis. The primary panels 1120 are mechanically affixed to respective parts of the outer wall 1205 that are externally facing with respect to the longitudinal axis, while the secondary panels 1130 can optionally be connected to the respective parts of the outer wall 1205 that lie below these externally facing parts.

In alternative variations of the second example, the secondary panels 1130 are omitted, and eternally exposed parts of the outer wall 1205, intercalated between adjacent pairs of primary panels 1120, constitute the external walls 1150 together with the primary panels 1120.

In yet other alternative variations of the second example, primary panels 1120 and the secondary panels 1130 are omitted, and the outer wall 1205 constitutes the external walls 1150.

The body 1200 further comprises at least one conduit 1220 providing selective fluid communication between the inflation system 1300 and the inner space S'. Optionally, a non-return valve 1230 can be provided in the at least one conduit 1220 for preventing backflow of the gas or other fluid out from the body 1200 once the inflation system 1300 ceases to provide the required inflation pressure.

Figure 13:
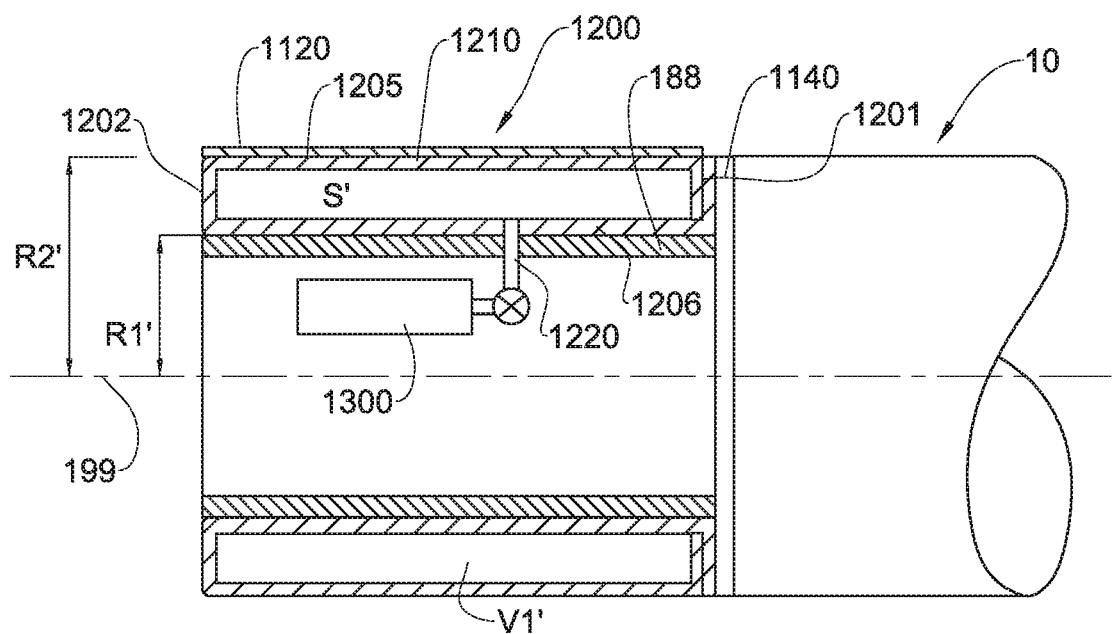
FIG. 13 illustrates in transverse cross-sectional side view the example FIG. 11, taken along D-D.

In this example, and referring to FIG. 13, in the deflated state the body 1200 fits within a tubular-like envelope, having an internal radius R1' taken from the longitudinal axis 99, and an external radius R2', and the inner space S' is nominally zero, or at least occupies a minimum volume.

For example, external radius R2' is such that in the undeployed configuration the external walls 1115 are within a cylindrical envelope having a diameter that is within ±10% of a baseline diameter, wherein the baseline diameter is a diameter of the air vehicle 10 immediately forward of the flare module 1100 when the flare module 1100 is mounted to the air vehicle 10.

Figure 12:
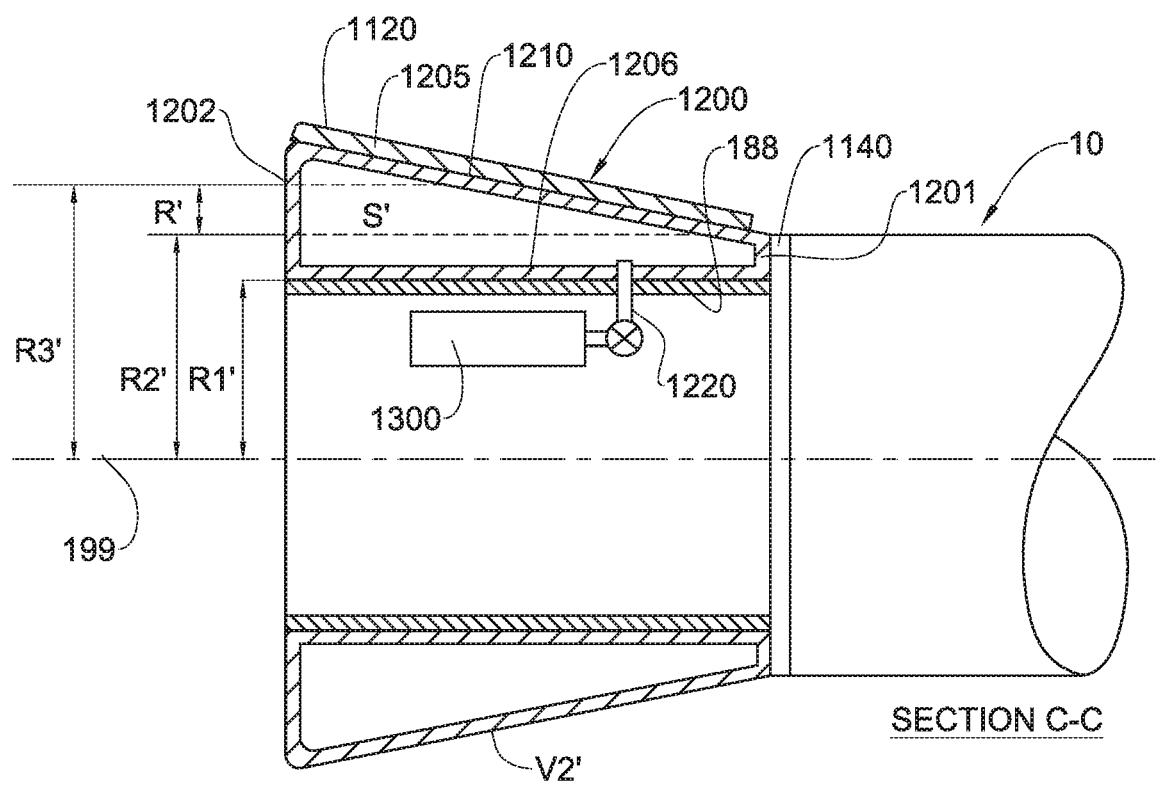
FIG. 12 illustrates in transverse cross-sectional side view the example FIG. 10, taken along C-C.

In the inflated configuration the body 1200, and referring to FIG. 12, has a generally toroidal shape in which the cross section is now generally trapezoidal (or other suitable cross-section shape—for example polygonal etc.) and uniform along a circumferential direction about the axis 99, though other shapes are of course possible.

In this example the body 1200, in particular the skin 1210, is formed from a suitable non-elastic and non-rigid material—for example this allows the body to be folded multiple times, or can be in an accordion shape (for example having a bellows-type body), and is expanded to the deployed configuration without any significant stretching or change in the surface area of the body skin 1210. Alternatively, and in other variations of this example, the body 1200, in particular the skin 1210, is formed from an elastic material, that itself stretches when the body 1200 is inflated. Thus, in the inflated configuration, the surface area of the skin 1210 can be significantly larger than in the deflated configuration.

In any case, it is to be noted that in this example, while in the inflated configuration while the body 1200 has substantially the same inner radius R1' as in the deflated configuration, the mean external radius R3' in the inflated configuration is considerably larger than the external radius R2' in the deflated configuration.

As the body 1200 becomes inflated, the radial dimension thereof increases by an average amount W (see FIG. 12), corresponding to the difference in external radius R3' and external radius R2', driving the external walls 1115 from the undeployed configuration to the deployed configuration.

In this example, the body 1200 also fits over tubular aft internal casing 188 of the air vehicle, and thus inner radius R1' is just greater than an outer radius of the aft internal casing 188. The aft internal casing 188 projects in an aft direction from the load bearing structure 1140.

In alternative variations of this example, in which the air vehicle does not have an aft internal casing 188, a non-inflatable permanent plug or other support structure can be provided in the center of the body 1200, similar in external geometric form to the aft internal casing 188 to maintain the body 1200 aligned coaxially with axis 199. Alternatively the body 1200 can include an inflatable plug provided in the center of the body 1200, which is inflated concurrently or prior to inflation of the toroidal body to provide an external geometric form similar to that of the aft internal casing 188 to maintain the body 1200 aligned coaxially with axis 199. Alternatively the body 1200 is non-toroidal, and is formed without a central opening, for example as a suitable body of revolution with respect to axis 199, but providing the same external profile of the outer wall 1205 as before.

In the second example, as the body 1200 becomes inflated from the deflated configuration to the inflated configuration, the body 1200 assumes the desired outer shape for the flare module, and concurrently radially pushes and rotates the primary panels 1120 and/or the secondary panels 1130 in an outward radial direction thereby deploying the external walls 1115, from the undeployed configuration of FIG. 11 to the deployed configuration of FIG. 12, and thereby concurrently shifting the center of pressure for the air vehicle 10 from the first position to the second position.

In variations of the second example in which the external walls 1115 are provided exclusively or partially by the outer wall 1205, as the body 1200 becomes inflated from the deflated configuration to the inflated configuration, the body 1200, in particular outer wall 1205, assumes the desired outer shape for the flare module, thereby effectively deploying the external walls 1115, from the undeployed configuration of FIG. 11 to the deployed configuration of FIG. 12, and thereby concurrently shifting the center of pressure for the air vehicle 10 from the first position to the second position.

Optionally, the body 1200 can be shaped or otherwise configured for facilitating expansion thereof in the radial direction preferentially. For example, the body 1200 can optionally comprise radial ribs, and or can include a plurality of interconnected internal chambers.

It is evident that at least in the second example, and at least in some of the alternative variations thereof, the body 1200, in the form of an expansion member, in particular in the form of the inflatable member, that is affixed to or integral with the external walls 1115 of the flare module.

Optionally, in this example, the flare module 1100 can further optionally comprise a locking mechanism (not shown) for locking the body 1200 and/or he external walls 1115 in the deployed configuration, for example similar to the locking mechanism disclosed herein for the first example, mutatis mutandis.

Alternatively, such a locking mechanism may be omitted, for example where the body 1200 remains inflated after attaining the inflated configuration.

In operation, the body 1200 is selectively inflated from the deflated configuration to the inflated configuration via the action of the inflation system 1300. Thus, the inflation system 1300 is configured for selectively inflating the body 1200 from the deflated configuration to the inflated configuration, and for example comprises a fluid supply, typically a pressurized gas, that can be selectively driven into the body 1200 for inflating the same.

In the above examples, the external radius of the respective flare module increases in an aft longitudinal direction, in the deployed configuration.

Figure 16A:
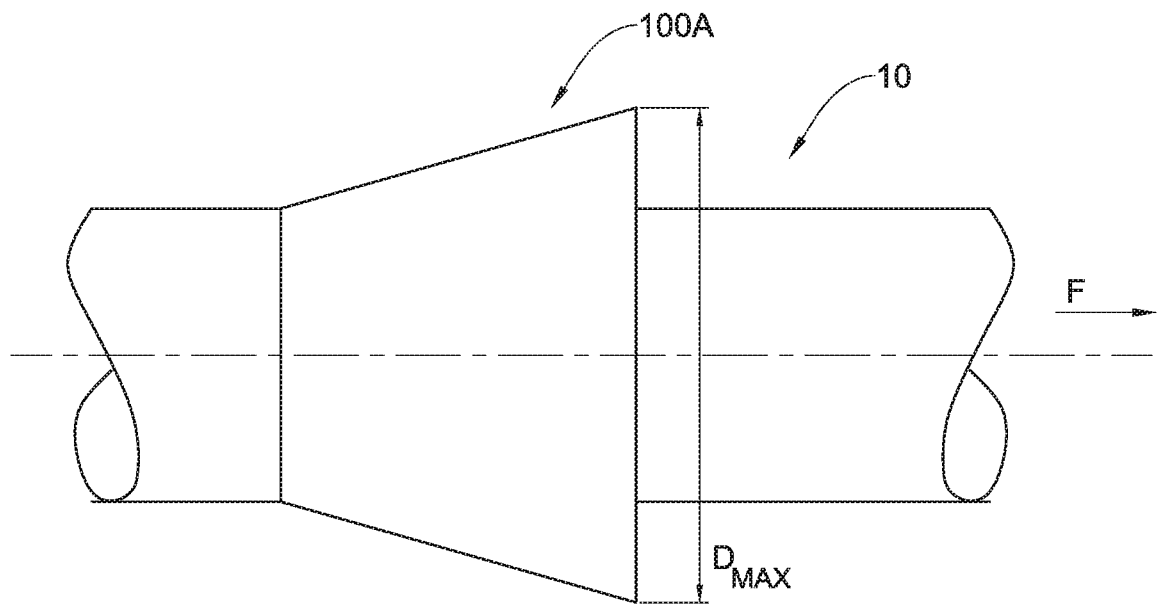
FIG. 16(a) and FIG. 16(b) show, in side view, an apparatus according to an alternative variation the examples of FIGS. 1 to 15(b), in deployed configuration and in undeployed configuration, respectively.
Figure 16B:
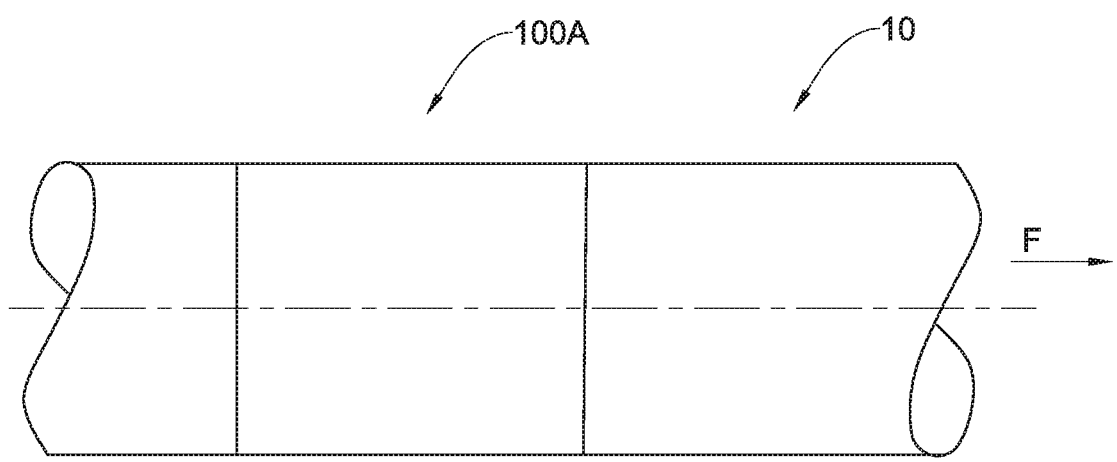

In alternative variations of the above examples, the external radius of the respective flare module 100A can instead decrease in an aft longitudinal direction from a maximum diameter $D_{MAX}$, in the deployed configuration, for example as illustrated in FIG. 16(a), while in the undeployed configuration is illustrated in FIG. 16(b). For example, such a flare module can be used for selectively providing a large increase in drag for an air vehicle.

Figure 17A:
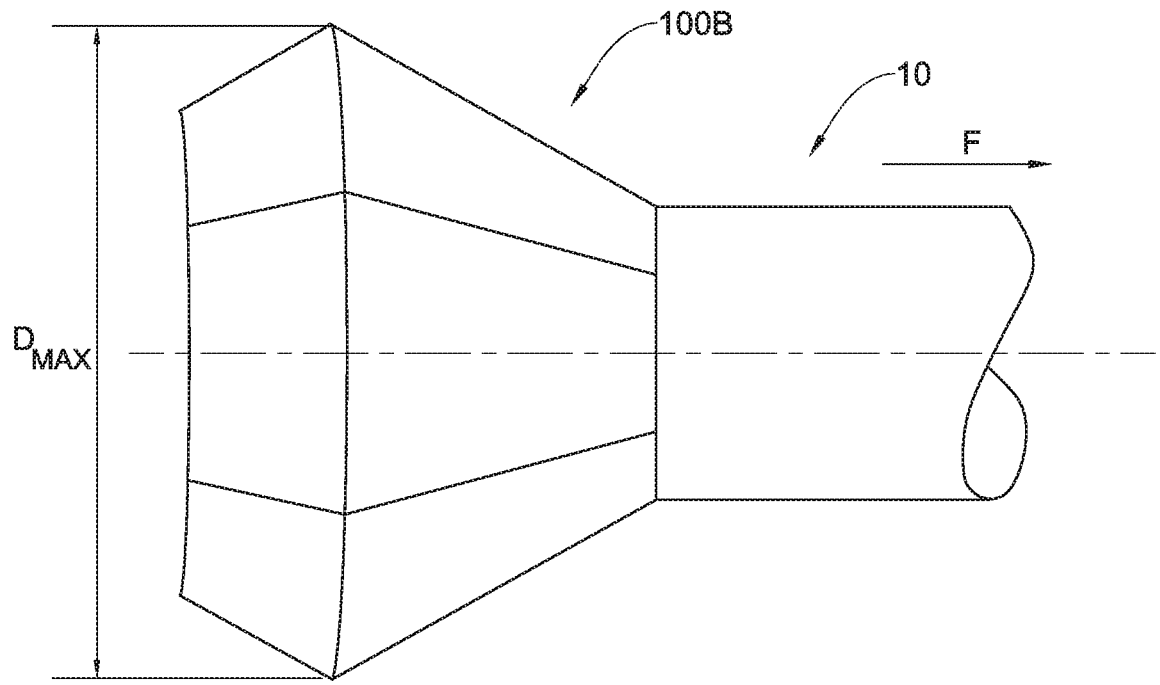
FIG. 17(a) and FIG. 17(b) show, in side view, an apparatus according to another alternative variation the examples of FIGS. 1 to 15(b), in deployed configuration and in undeployed configuration, respectively.
Figure 17B:
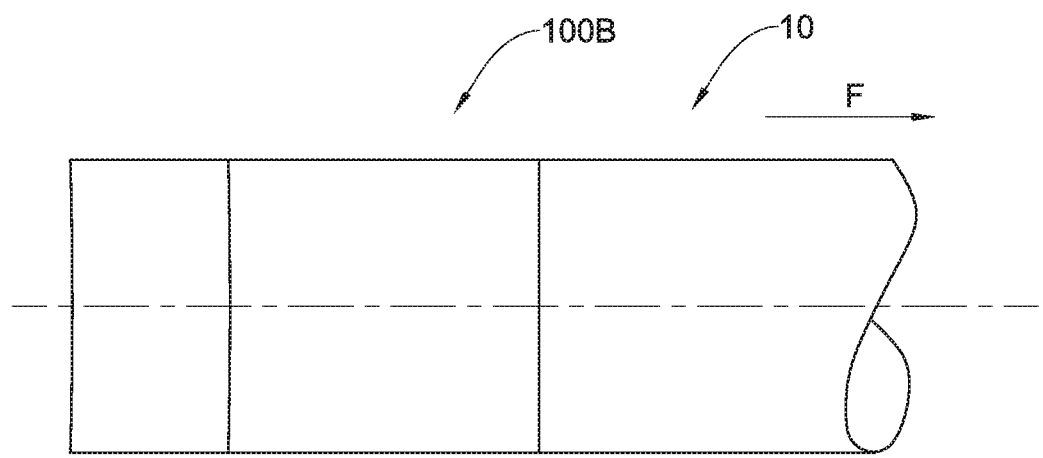

In yet other alternative variations of the above examples, the external radius of the respective flare module 100B can instead first increase to a maximum diameter $D_{MAX}$, and then decrease, in an aft longitudinal direction, in the deployed configuration, for example as illustrated in FIG. 17(a), while in the undeployed configuration is illustrated in FIG. 17(b). For example, such a flare module can be used for selectively providing a shift in the center of lift, and/or for providing reduced base drag, as compared with the examples illustrated in FIGS. 1 to 15(b).

Figure 18A:
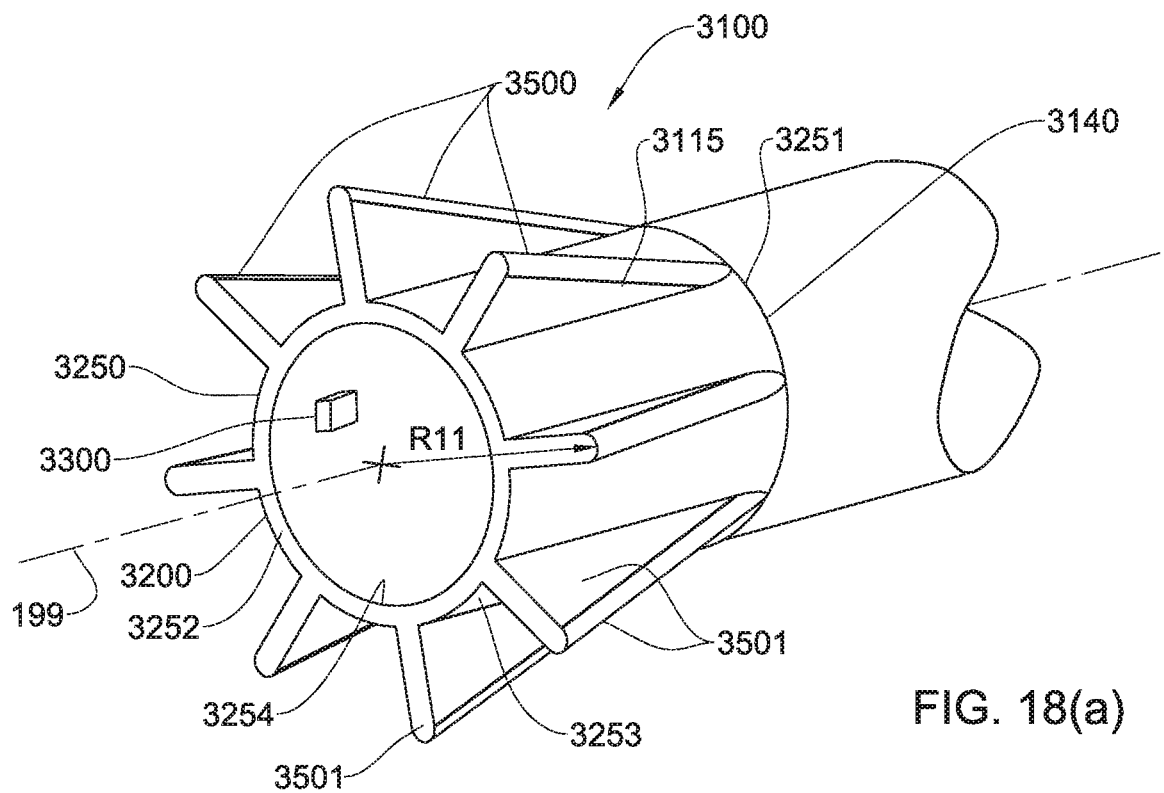
FIG. 18(a) and FIG. 18(b) show, in rear perspective view, an apparatus according to the first example of the presently disclosed subject matter, in deployed configuration and in undeployed configuration, respectively.
Figure 18B:
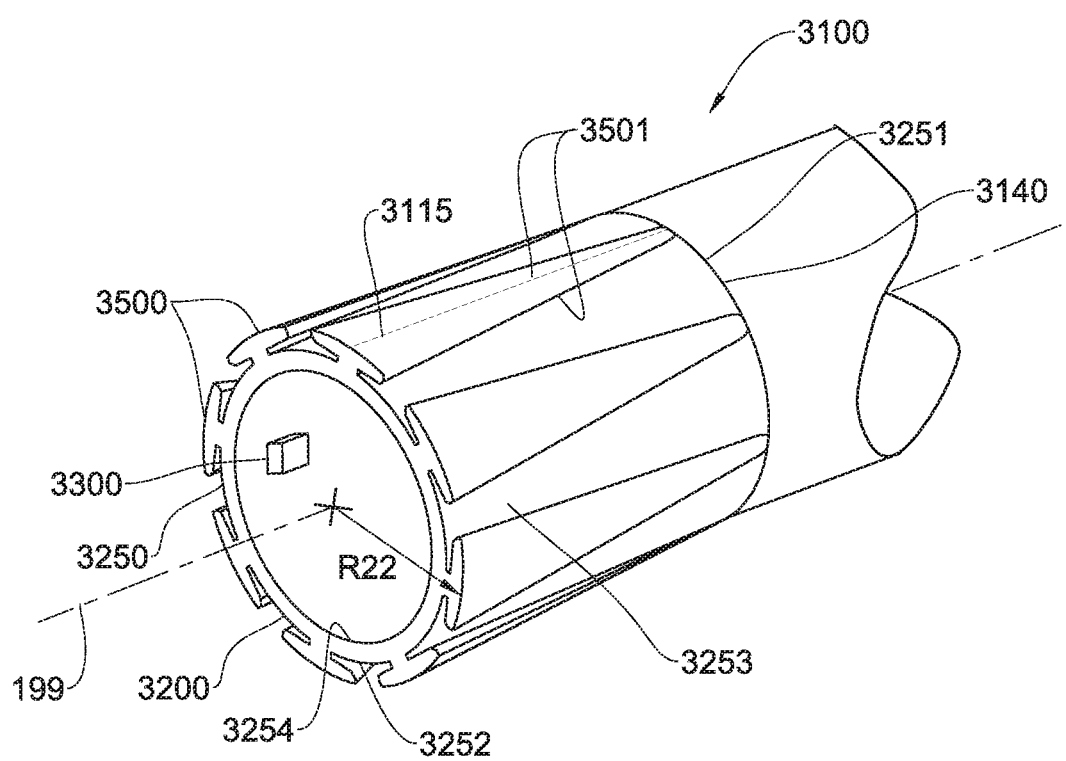

Referring to FIGS. 18(a) and 18(b), an apparatus for controlling the motion of a vehicle 10 in a fluid medium M, according to a third example of the presently disclosed subject matter, is in the form of a fin module, generally designated herein with reference numeral 3100.

In general, the flare module 3100 is configured for deploying from a non-deployed configuration to a deployed configuration after the projectile has been fired from a weapons barrel.

Fin module 3100 comprises external walls 3115, an expandable body in the form of an inflatable body 3200, and actuation mechanism in the form of an inflation system 3300, similar for example to the flare module 100, external walls 115, inflatable body 200 and inflation system 300, respectively, of the first example or second example or alternative variations thereof, as disclosed above, mutatis mutandis, with some differences, as will become clearer herein.

As with the first example, second example, and at least some alternative variations thereof, the fin module 3100 transmits a moment to the air vehicle 10 via load bearing structure 3140, for example similar to the load bearing structure 1140 as disclosed herein, mutatis mutandis. Furthermore, the fin module 3100 defines a reference axis in the form of longitudinal axis 199 passing through the geometric center of the load bearing structure 3140, and which in general is aligned with the longitudinal axis 98 of the vehicle 10 when mounted thereto.

In the third example of the presently disclosed subject matter, the body 3200 comprises a central plug portion 3250 and a plurality of fin elements 3500. The central plug portion 3250 in this example has a generally tubular geometrical form, but in alternative variations of this example, this geometrical form can instead be, for example, fustro-conical or faceted (for example having a polygonal transverse cross-section). In any case, the central plug portion 3250 has a circumferential periphery 3255, and the fin elements 3500 are circumferentially disposed along the circumferential periphery 3255, in this example in a homogenous manner with equal spacing between adjacent pairs of fin elements 3500.

In this example, central plug portion 3250 can be non-expandable, and maintains its shape when the inflatable body 3200 is inflated. However, in alternative variations of this example, the central plug portion 3250 is expandable when the inflatable body 3200 is inflated.

The central plug portion 3250 is in the form of a hollow tube, comprising an annular front wall 3251, and an annular aft wall 3252, cylindrical outer wall 3253, and cylindrical inner wall 3254, which together define an internal plug chamber (not shown), which is generally annular. In alternative variations of this example, the central plug portion can be in the form of a closed tube, and/or one or both of the inner wall 3254 and outer wall 3254 can be frustro conical or faceted, for example, and in each case also similarly define an internal plug chamber.

Each of the fin elements 3500 has aerofoil sections in planes parallel to and radially spaced from the longitudinal axis 199. In this example, the aerofoil sections have zero camber, and thus the fin elements 3500 are symmetrical with respect to a plane intersecting the cord thereof. However, in alternative variations of this example all or some of the fin elements can instead be configured with cambered aerofoil sections, and/or set at an angle of attack with respect to the longitudinal axis 199, for example to induce roll, pitch or yaw moments to the fin module 3200.

Each of the fin elements 3500 is selectively inflatable via the inflation system 3300, from a deflated configuration (FIG. 18(b)) to an inflated configuration (FIG. 18(a)), and defines an internal fin chamber (not shown) in fluid communication with the internal plug chamber.

In this example, the fin elements 3500 are configured for deploying from the undeployed configuration to the deployed configuration (responsive to operation of the inflation system 3300) in generally radial directions away from the longitudinal axis 199.

Thus, in the deployed configuration (FIG. 18(a)), the fin elements 3500 are radially projecting from the longitudinal axis 199 to a radius R11, whereas in the undeployed configuration (FIG. 18(b)), the fin elements 3500 are in a radially collapsed configuration and are thus radially projecting from the longitudinal axis 199 at a radius R22, wherein R22 is smaller than R11.

In this example, each of the fin elements 3500 can have one or more fin fold lines 3501, and in the deflated configuration the fin elements 3500 are at least partially folded at these fin fold lines. For example, at least some or all the fin fold lines are at least partially aligned longitudinally.

Thus, the fin elements 3500 comprise the external walls 3115, and in the inflated configuration provide the required geometry for the external surfaces of the external walls 3115 that are exposed to the airflow. Thus, as the body 3200 changes geometry when inflated to the inflated configuration from the deflated configuration enables the fin elements 3500 to be deployed to the deployed configuration and for the external walls 3115 interact aerodynamically with the airflow to produce an aerodynamic effect, in this example to change the position of the center of lift control of the air vehicle 10. When it is desired to deploy the apparatus 3100, the inflatable body 3200 is inflated from the deflated configuration of FIG. 18(b) to the inflated configuration of FIG. 18(a) (for example in a similar manner to the inflatable body of the first or second examples or alternative variations thereof as disclosed here, mutatis mutandis), thereby causing the fin elements 3500 to inflate from the respective deflated configuration to the respective inflated configuration, in an outwardly direction away from the axis 199 and thereby effectively increasing the projection of the fin elements 3500 to radius R11. As in other examples, deployment of the apparatus 3100 results in the center of pressure for the projectile 10 being shifted as compared with the position of the center of pressure in the undeployed configuration.

Figure 19A:
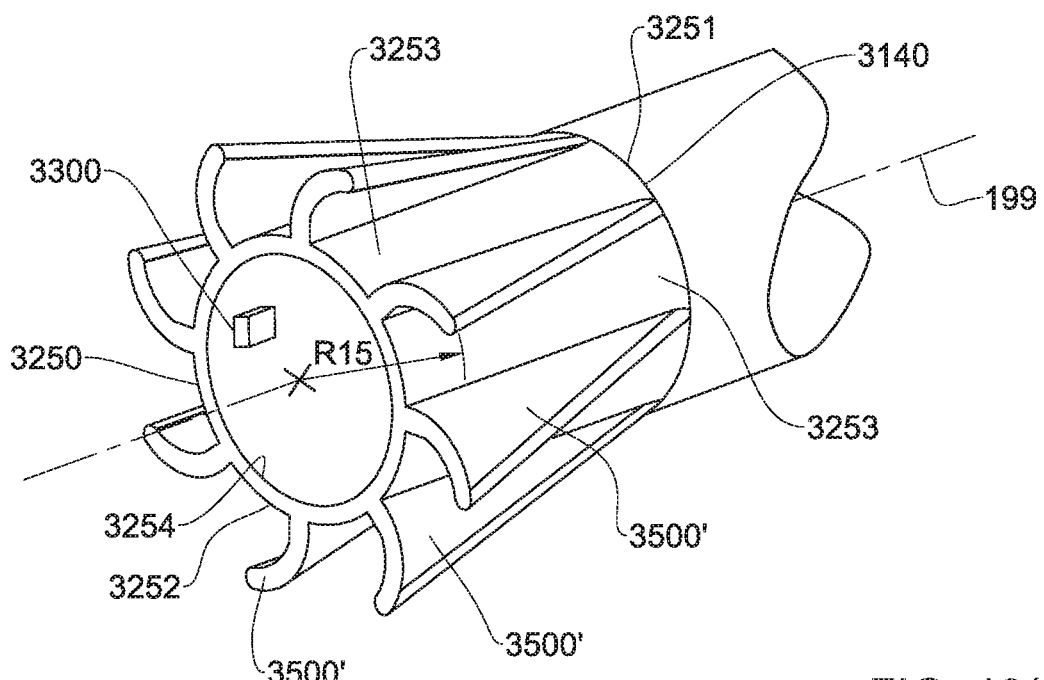
FIG. 19(a) and FIG. 19(b) show, in side view, an apparatus according to another alternative variation the examples of FIGS. 18(a) and 18(b), in undeployed configuration and in deployed configuration, respectively.
Figure 19B:
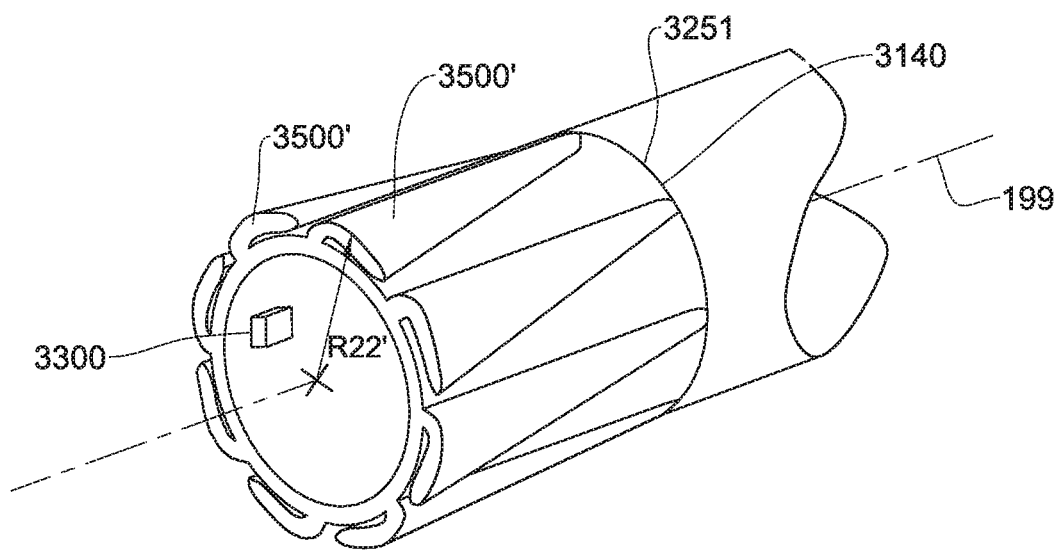

In a variation of the third example, and referring to FIGS. 19(a) and 19(b), the wing elements 3500 are replaced with wing elements 3500'. In the undeployed configuration the fin elements 3500' adopt a wrap-around configuration with respect to said plug portion (FIG. 19(b)), and project to a radius R22' from axis 199. In the deployed configuration the fin elements 3500' are inflated and unwrap, and project further from the axis 199 to a radius R11', that is greater than radius R22'. In this example the fin elements 3500' have a non-linear configuration, wherein a span of each said fin is curved. Alternatively, the fin elements 3500' can instead have a linear configuration (for example similar to the fin elements 3500 of the example of FIG. 18(a)), wherein a span of fin elements 3500' is rectilinear.

The curved wing elements 3500', when deployed, can thus provide a rolling moment to the fin module 3100 and to the vehicle 10 when mounted thereto.

When it is desired to deploy the apparatus 3100 according to the example illustrated in FIGS. 19(a) and 19(b), the inflatable body 3200 is inflated from the deflated configuration of FIG. 19(b) to the inflated configuration of FIG. 19(a) (for example in a similar manner to the inflatable body of the example of FIGS. 18(a) and 18(b), mutatis mutandis), thereby causing the fin elements 3500' to inflate from the respective deflated configuration to the respective inflated configuration, and thus unwrap outwardly circumferentially, in an outwardly direction away from the axis 199 and thereby effectively increasing the projection of the fin elements 3500' to radius R11'. As in other examples, deployment of the apparatus 3100 results in the center of pressure for the projectile 10 being shifted as compared with the position of the center of pressure in the undeployed configuration.

It is to be noted that in alternative variations of the third example illustrated in FIGS. 18(a) and 18(b), the fin elements 3500 can also have a non-linear configuration, wherein a span of each said fin is curved, for example similar to the example illustrated in FIG. 19(a).

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. An apparatus for a projectile, the projectile configured to be launched from a weapons barrel, wherein in operation of the apparatus in association with the projectile under predetermined operating conditions the projectile has a center of pressure, said predetermined operating conditions including an operating airspeed for the projectile greater than a threshold airspeed, the apparatus defining a reference axis, the apparatus comprising:
   a body inflatable from a deflated configuration having a first volume to an inflated configuration having a second volume, said second volume being greater than said first volume;
   an inflation system for selectively inflating said body from said deflated configuration to said inflated configuration;
   external walls deployable from an undeployed configuration to a deployed configuration responsive to said body being inflated from said deflated configuration to said inflated configuration;
   wherein in said undeployed configuration and at said operating airspeed, said center of pressure is located at a first position with respect to the projectile along said reference axis;
   and
   wherein in said deployed configuration said external walls provide a deployed external surface geometry exposed to an airflow corresponding to said operating airspeed, such that said center of pressure is located at a second position with respect to the projectile along said reference axis, said second position being different from said first position.

2. The apparatus according to claim 1, wherein in said deployed configuration said deployed external surface geometry is outwardly projecting with respect to said reference axis as compared with a nominal external surface geometry of said external walls provided in said undeployed configuration.

3. The apparatus according to claim 1, wherein in said deployed configuration said external walls provide a deployed external surface geometry that is exposed to an airflow in operation of the apparatus and that has a first forward facing area, and wherein in said undeployed configuration said external walls provide an undeployed external surface geometry that is exposed to said airflow in operation of the apparatus and that has a second forward facing area, said first forward facing area being greater than said second forward facing area.

4. The apparatus according to claim 1, wherein said threshold airspeed is 0.6 Mach Number or greater than 0.6 Mach Number.

5. The apparatus according to claim 1, including at least one of the following:
wherein said reference axis is a longitudinal axis of the projectile or is coaxial with a longitudinal axis of the projectile;
wherein said second position is aft with respect to said first position along said reference axis, or, wherein said second position is forward with respect to said first position along said reference axis;
wherein said external walls are configured for deploying from said undeployed configuration to said deployed configuration in directions along more than one axis orthogonal to said reference axis;
wherein said external walls are configured for deploying from said undeployed configuration to said deployed configuration in a plurality of radial directions away from said reference axis;
wherein said body circumferentially encloses said reference axis in planes orthogonal to said reference axis;
wherein said body is generally axisymmetric with respect to said reference axis; or
wherein said apparatus is in the form of a flare module.

6. The apparatus according to claim 1, wherein said deployed external geometry defines a generally frusto-conical form or a generally cylindrical form.

7. The apparatus according to claim 6, wherein said frusto-conical form has an external diameter that increases in an aft direction with respect to the projectile.

8. The apparatus according to claim 2, wherein said nominal external surface geometry defines a non-generally frusto-conical form.

9. The apparatus according to claim 1, including one of the following:
wherein in said deflated configuration said external walls are accommodated within a cylindrical envelope having a diameter within ±10% of a baseline diameter, wherein the baseline diameter is a diameter of the projectile immediately forward of the apparatus when the apparatus is mounted to the projectile;
wherein in said deflated configuration said external walls have a generally undulating form, including a plurality of lobes;
wherein in said deflated configuration said external walls are partially folded at a plurality of fold lines, said fold line being at least partially aligned longitudinally;
wherein in said deflated configuration said external walls generally at least partially mutual overlapped in a circumferential direction with respect to said reference axis;
wherein said body has a general toroidal form; or
wherein said external walls comprise a plurality of petals, different from said body, and wherein said plurality of petals forms a flare assembly.

10. The apparatus according to claim 1, wherein said apparatus is in the form of a fin module, and including one of the following:
wherein said body comprises a central plug portion and a plurality of fin elements;
wherein said body comprises a central plug portion and a plurality of fin elements, and, wherein said central plug portion has a circumferential periphery, and wherein said fin elements is circumferentially disposed along said circumferential periphery;
wherein said plug portion defines an internal plug chamber, and wherein each said fin element defines an internal fin chamber in fluid communication with said internal plug chamber;
wherein each said fin element has aerofoil sections in planes parallel to and radially spaced from said reference axis;
wherein each said fin element has aerofoil sections in planes parallel to and radially spaced from said reference axis, and, wherein each said aerofoil section has zero camber;
wherein each said fin element is configured for deploying from said undeployed configuration to said deployed configuration in a generally radial directions away from said reference axis;
wherein each said fin element is configured for deploying from said undeployed configuration to said deployed configuration in a generally radial directions away from said reference axis, and, wherein in said undeployed configuration each said fin is in a radially collapsed configuration;
wherein in said deflated configuration said fin elements are at least partially folded at a plurality of fin fold lines, said fin fold line being at least partially aligned longitudinally;
wherein in said undeployed configuration said fins adopt a wrap-around configuration with respect to said plug portion;
wherein in said deployed configuration said fins have a linear configuration, wherein a span of each said fin is rectilinear; or
wherein in said deployed configuration said fins have a non-linear configuration, wherein a span of each said fin is curved.

11. The apparatus according to claim 1, wherein said body comprises any one of a balloon-type body and a bellows-type body.

12. The apparatus according to claim 1, wherein said body is configured for providing said deployed external surface geometry to said external walls.

13. The apparatus according to claim 12, including one of the following:
wherein said body comprises a first longitudinal end, a second longitudinal end longitudinally spaced from said first longitudinal end, an outer wall and an inner wall, wherein said first longitudinal end, said second longitudinal end, said inner wall and said outer wall define a body internal space, wherein said body internal space provides said first volume at said deflated configuration and said second volume at said inflated configuration;
wherein said body comprises a first longitudinal end, a second longitudinal end longitudinally spaced from said first longitudinal end, and an outer wall, wherein said first longitudinal end, said second longitudinal end, and said external wall define a body internal space, wherein said body internal space provides said first volume at said deflated configuration and said second volume at said inflated configuration;

wherein said body comprises a first longitudinal end, a second longitudinal end longitudinally spaced from said first longitudinal end, an outer wall and an inner wall, wherein said first longitudinal end, said second longitudinal end, said inner wall and said outer wall define a body internal space, wherein said body internal space provides said first volume at said deflated configuration and said second volume at said inflated configuration, and, wherein at least in the inflated configuration, the first longitudinal end has a larger outer width dimension than the second longitudinal end; or wherein said body comprises a first longitudinal end, a second longitudinal end longitudinally spaced from said first longitudinal end, and an outer wall, wherein said first longitudinal end, said second longitudinal end, and said external wall define a body internal space, wherein said body internal space provides said first volume at said deflated configuration and said second volume at said inflated configuration, and, wherein at least in the inflated configuration, the first longitudinal end has a larger outer width dimension than the second longitudinal end.

14. The apparatus according to claim 1, wherein at least a portion of said external walls is elastic, deforming between a first shape corresponding to said deflated configuration and a second shape corresponding to said inflated configuration.

15. The apparatus according to claim 1, wherein said apparatus is in the form of an aft module configured for being mounted with respect to an aft end of the projectile.

16. The apparatus according to claim 1, wherein said apparatus is in the form of an aft module configured for providing longitudinal stability to the projectile.

17. A projectile comprising the apparatus as defined in claim 1, the projectile being a shell.

18. A method for operating a projectile, the method comprising:
providing the projectile, the projectile comprising the apparatus as defined in claim 1;
at said predetermined conditions, selectively activating said inflation system to thereby inflate said body from said deflated configuration to said inflated configuration, and concurrently deploying said external walls from said undeployed configuration to said deployed configuration.

* * * * *